US012684517B2

(12) United States Patent
Määttänen et al.

(10) Patent No.: US 12,684,517 B2
(45) Date of Patent: Jul. 14, 2026

(54) TRACKING AREA UPDATE PROCEDURE FOR NTN

(71) Applicant: Telefonaktiebolaget LM Ericsson (PUBL), Stockholm (SE)

(72) Inventors: Helka-Liina Määttänen, Espoo (FI); Johan Rune, Lidingö (SE); Emre Yavuz, Stockholm (SE); Alexander Vesely, Feldbach (AT); Stefan Rommer, Västra Frölunda (SE); Paul Schliwa-Bertling, Ljungsbro (SE); Håkan Palm, Växjö (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 501 days.

(21) Appl. No.: 18/246,214

(22) PCT Filed: Sep. 23, 2021

(86) PCT No.: PCT/IB2021/058692
§ 371 (c)(1),
(2) Date: Mar. 22, 2023

(87) PCT Pub. No.: WO2022/064421
PCT Pub. Date: Mar. 31, 2022

(65) Prior Publication Data
US 2023/0362864 A1      Nov. 9, 2023

Related U.S. Application Data

(60) Provisional application No. 63/082,429, filed on Sep. 23, 2020.

(51) Int. Cl.
*H04W 60/04*        (2009.01)
*H04W 84/06*        (2009.01)

(52) U.S. Cl.
CPC ............ *H04W 60/04* (2013.01); *H04W 84/06* (2013.01)

(58) Field of Classification Search
None
See application file for complete search history.

(56) References Cited

U.S. PATENT DOCUMENTS

2010/0285816 A1     11/2010   Vos et al.

FOREIGN PATENT DOCUMENTS

JP          2020515157 A       5/2020
WO        2018170516 A2       9/2018
(Continued)

OTHER PUBLICATIONS

ZTE Corporation, et al., "Consideration on system information and cell (re)selection in NTN", 3GPP TSG-RAN WG2 Meeting#111, R2-2006872, Aug. 17-28, 2020, 6 Pages, Electronic.
(Continued)

*Primary Examiner* — Kouroush Mohebbi
(74) *Attorney, Agent, or Firm* — Baker Botts L.L.P.

(57) ABSTRACT

According to some embodiments, a method performed by a wireless device operating in a non-terrestrial network (NTN) comprises receiving a first tracking area identity (TAI) from a first cell. The first cell is an earth moving cell and the first TAI is associated with a first fixed tracking area. The method further comprises receiving a second TAI. The second TAI is associated with a second fixed tracking area. The method further comprises determining whether the wireless device should notify a network node of a tracking area update based at least in part on information related to the second TAI, and upon determining the wireless device should notify the network node of the tracking area update, transmitting a tracking area update.

12 Claims, 20 Drawing Sheets

1300

(56) References Cited

FOREIGN PATENT DOCUMENTS

| WO | WO-2020034333 A1 * | 2/2020 | ............ H04W 68/02 |
| WO | WO2020091647 A1 | 5/2020 | |
| WO | 2020156674 A1 | 8/2020 | |

OTHER PUBLICATIONS

Nokia, et al., "Discussion on network identities handling", 3GPP TSG-RAN WG3 Meeting #109-e, R3-205266, Aug. 17-28, 2020, 4 Pages.
Samsung, "Control Plane Enhancements for Idle and Inactive Modes in an NTN-Overall Observations and Proposals", 3GPP TSG RAN WG2 Meeting #111, R2-2006945, Aug. 17-28, 2020, 7 Pages, e-Meeting.
3GPP TR 38.811 V15.3.0 (Jul. 2020); 3rd Generation Partnership Project; Technical Specification Group Radio Access Network; Study on New Radio (NR) to support non-terrestrial networks (Release 15).
3GPP TSG RAN meeting #80; La Jolla, USA, Jun. 11-14, 2018; Source: Thales; Title: Study on solutions evaluation for NR to support Non Terrestrial Network Type: SID new; Document for: Approval; Agenda Item: 9.1.17—Study on solutions evaluation for NR to support Non Terrestrial Network, moderator: Thales (RP-181370).
3GPP TSG-RAN WG2 Meeting #107bis; Congqing, China; Oct. 14-18, 2019; Source: ZTE Corporation, Sanechips; Title: Further consideration on tracking area management in NTN; Agenda: 6.6.4.2 (R2-1912670 (Revision of R2-1909263)).
3GPP TR 38.821 v16.0.0 (Dec. 2019) 3rd Generation Partnership Project; Technical Specification Group Radio Access Network; Solutions for NR to support non-terrestrial networks (NTN) (Release 16).
3GPP TSG-RAN WG2 Meeting #108; Reno, USA, Nov. 18-22, 2019; Agenda item: 6.6.4.1; Source: ITRI; Title: Discussion on TAI list provisioning and TAU triggering (R2-1915073).
PCT International Search Report issued for International application No. PCT/IB2021/058692—Feb. 11, 2022.
PCT Written Opinion of the International Searching Authority issued for International application No. PCT/IB2021/058692—Feb. 11, 2022.
Malaysia Notice of Allowance in MY Application No. P12023001557 dated Apr. 23, 2026 (translated).

* cited by examiner

1300

1312 – obtain a list of one or more TAIs

1314 – receive a TAI broadcast schedule

1316 – receive a first TAI from a first cell

1318 – receive a second TAI

1320 – Update?

1322 – transmit a tracking area update

1400

1412 – determine a list of one or more TAIs that will be valid in an earth moving cell over a period of time 1414 – transmit the list of one or more TAIs to a wireless device in the cell 1416 – transmit one or more of a time delay and a minimum cell quality to a wireless device 1418 – broadcast a first TAI in the cell 1420 – determine to broadcast a second TAI in the cell 1422 – broadcast the second TAI in the cell

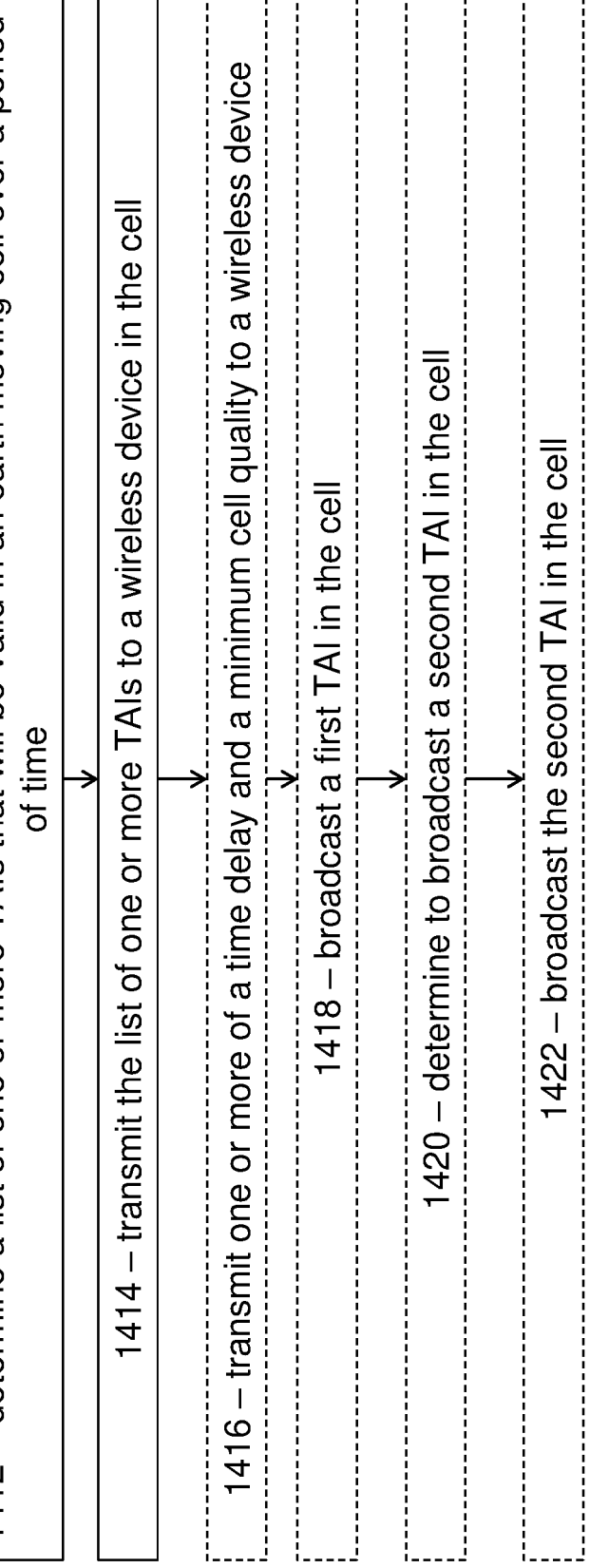

Fig. 14

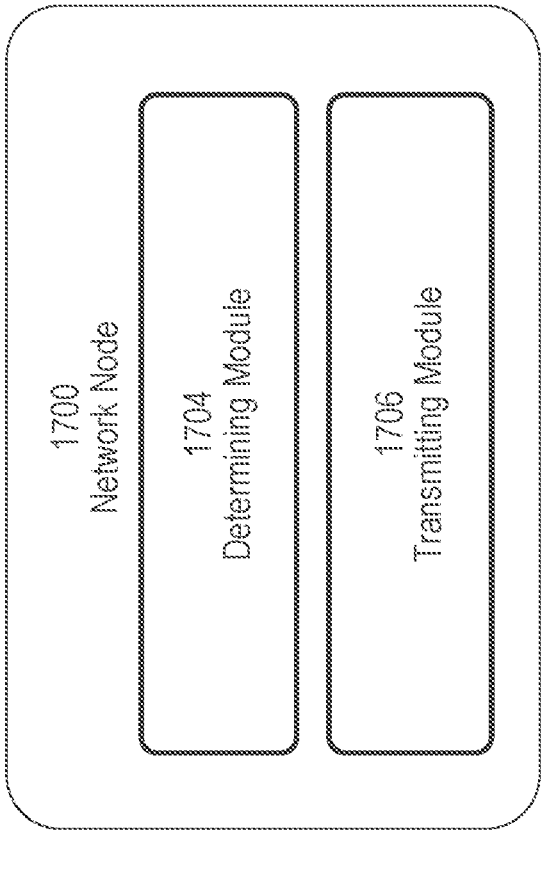
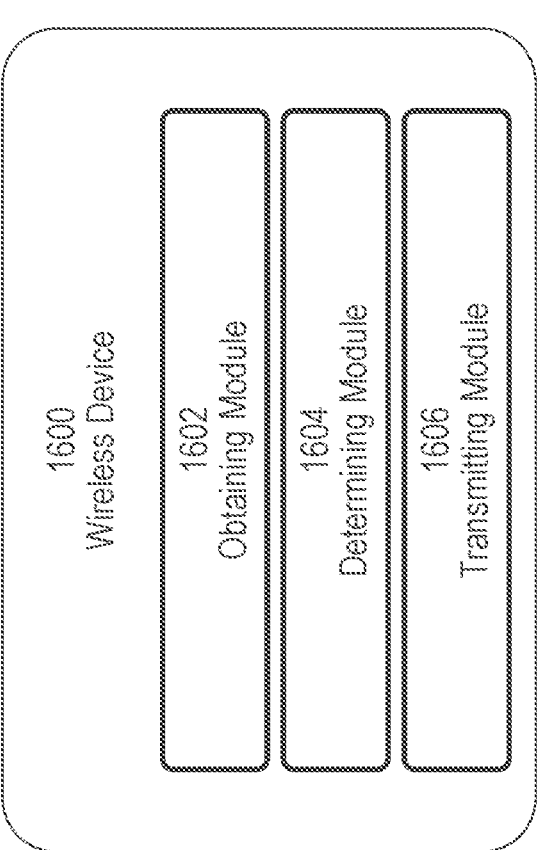
Fig. 15

710
Host computer provides user data

720
Host computer initiates transmission carrying the user data to the UE

730
UE receives the user data

611
Host computer executes client application

610
Host computer provides user data

620
Host computer initiates transmission carrying the user data to the UE

630
Base station transmits the user data

640
UE executes client application

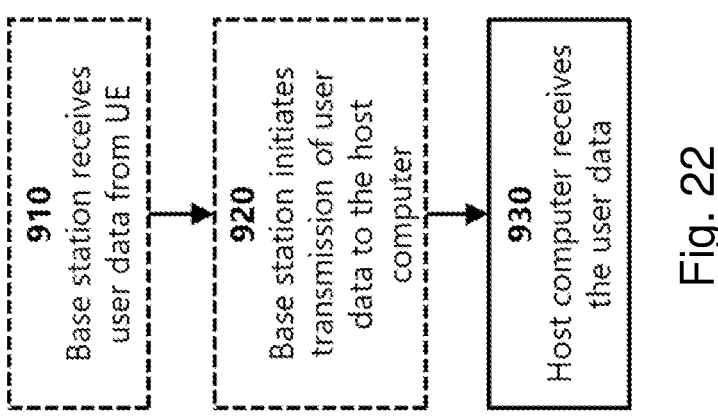

910
Base station receives user data from UE

920
Base station initiates transmission of user data to the host computer

930
Host computer receives the user data

Fig. 22

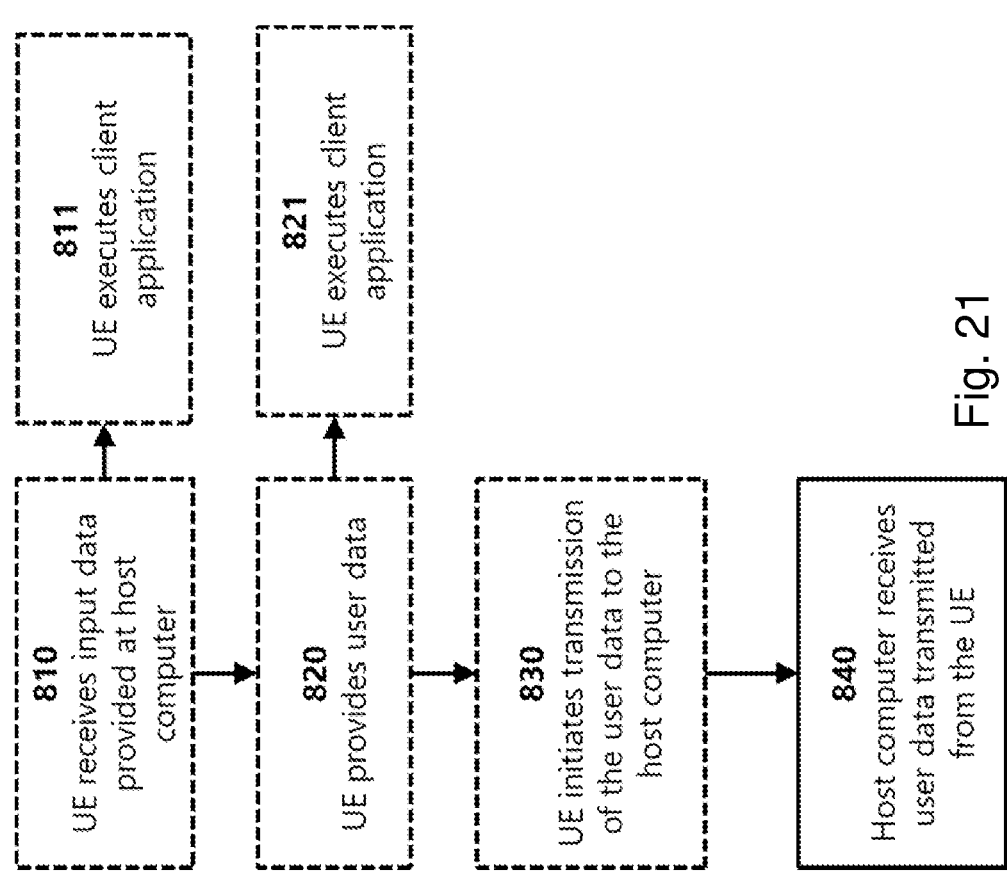

811
UE executes client application

821
UE executes client application

810
UE receives input data provided at host computer

820
UE provides user data

830
UE initiates transmission of the user data to the host computer

840
Host computer receives user data transmitted from the UE

Fig. 21

TRACKING AREA UPDATE PROCEDURE FOR NTN

PRIORITY

This nonprovisional application is a U.S. National Stage Filing under 35 U.S.C. § 371 of International Patent Application Serial No. PCT/IB2021/058692 filed Sep. 23, 2021 and entitled "TRACKING AREA UPDATE PROCEDURE FOR NTN" which claims priority to U.S. Provisional Patent Application No. 63/082,429 filed Sep. 23, 2020 both of which are hereby incorporated by reference in their entirety.

TECHNICAL FIELD

Embodiments of the present disclosure are directed to wireless communications and, more particularly, to tracking area update procedures for non-terrestrial networks (NTNs).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) wireless communication specifications include the evolved packet system (EPS). EPS is based on the long-term evolution (LTE) radio network and the evolved packet core (EPC). It was originally intended to provide voice and mobile broadband (MBB) services but has continuously evolved to broaden its functionality. For example, narrowband Internet-of-Things (NB-IoT) and LTE for machines (LTE-M) are part of the LTE specifications and provide connectivity to massive machine type communication (mMTC) services.

3GPP Release 15 includes the 5G system (5GS). 5G is a next generation radio access technology to serve use cases such as enhanced mobile broadband (eMBB), ultra-reliable and low latency communication (URLLC) and mMTC. 5G includes the new radio (NR) access stratum interface and the 5G core network (5GC). The NR physical and higher layers reuse parts of the LTE specification, and to that add needed components when motivated by the new use cases.

3GPP has also started work to prepare NR for operation in a non-terrestrial network (NTN). The work includes study item "NR to support Non-Terrestrial Networks" which resulted in TR 38.811 and the study item "Solutions for NR to support Non-Terrestrial Network". Work to enhance the 5G core network to support NR NTN is ongoing. In parallel, interest to adapt LTE for operation in NTN is growing. As a consequence, 3GPP may support NTN in both LTE and NR.

A satellite radio access network usually includes the following components: a satellite that refers to a space-borne platform; an earth-based gateway that connects the satellite to a base station or a core network, depending on the choice of architecture; a feeder link that refers to the link between a gateway and a satellite; and an access link that refers to the link between a satellite and a UE.

Depending on the orbit altitude, a satellite may be categorized as low earth orbit (LEO), medium earth orbit (MEO), or geostationary earth orbit (GEO) satellite. LEO: includes typical heights ranging from 250-1,500 km, with orbital periods ranging from 90-120 minutes. MEO includes typical heights ranging from 5,000-25,000 km, with orbital periods ranging from 3-15 hours. GEO includes height at about 35,786 km, with an orbital period of 24 hours.

The significant orbit height means that satellite systems are characterized by a path loss that is significantly higher than what is expected in terrestrial networks. To overcome the pathloss, the access and feeder links are commonly operated in line of sight conditions and the user equipment (UE) is equipped with an antenna offering high beam directivity.

A communication satellite typically generates several beams over a given area. The footprint of a beam is usually an elliptic shape, which has been traditionally considered as a cell. The footprint of a beam is also often referred to as a spotbeam. The spotbeam may move over the earth surface with the satellite movement or may be earth fixed with a beam pointing mechanism used by the satellite to compensate for its motion. The size of a spotbeam depends on the system design, which may range from tens of kilometers to a few thousands of kilometers. FIG. 1 illustrates an example architecture of a satellite network with bent pipe transponders.

The NTN beam may in comparison to the beams observed in a terrestrial network be very wide and cover an area outside of the area defined by the served cell. Beam covering adjacent cells will overlap and cause significant levels of intercell interference. To overcome the large levels of interference a typical approach is for a NTN to configure different cells with different carrier frequencies and polarization modes.

To support mobility management, one feature of wireless networks is the tracking area (TA). A tracking area is a logical grouping of cells in a LTE or NR network. Tracking areas are used to manage and represent the location of UEs.

NTNs and earth moving beams cause issues regarding the handling of tracking area updates. Both hard and soft switches are considered. A hard switch means that each cell only broadcasts one tracking area code. When this is combined with an earth fixed tracking area, it may create fluctuation at the border areas of the earth fixed tracking areas.

FIG. 2 is a timing diagram illustrating an example tracking area update for earth moving beams with hard TAI update. As the satellite moves from right to left and transitions from tracking area 1 to tracking area 2, the satellite makes a hard switch from transmitting an identifier of tracking area 1 to transmitting an identifier of tracking area 2.

For a soft TAI update, the network broadcasts more than one TAI for a cell and public land mobile network (PLMN). FIG. 3 is a timing diagram illustrating an example tracking area update for earth moving beams with soft TAI update. As the satellite moves from right to left and transitions from tracking area 1 to tracking area 2, the satellite transmits an identifier of tracking area 1 and an identifier of tracking area 2 for a duration of time during the transition.

There currently exist certain challenges. For example, as described in more detail below, earth moving satellites may result in inefficient or unnecessary tracking area updates by the UE.

SUMMARY

Based on the description above, certain challenges currently exist with tracking area updates for non-terrestrial networks (NTNs). Certain aspects of the present disclosure and their embodiments may provide solutions to these or other challenges. For example, particular embodiments manage earth-fixed tracking areas in systems with moving cells. Particular embodiments include delaying and/or controlling a UE's sending of registration updates when the TAI changes and reducing the NG application protocol (NGAP) signalling between gNB and the access and mobility management function (AMF) when the TAIs broadcast by a gNB change over time.

According to some embodiments, a method performed by a wireless device operating in a non-terrestrial network comprises receiving a first tracking area identity from a first cell. The first cell is an earth moving cell and the first TAI is associated with a first fixed tracking area. The method further comprises receiving a second TAI. The second TAI is associated with a second fixed tracking area. The method further comprises determining whether the wireless device should notify a network node of a tracking area update based at least in part on information related to the second TAI, and upon determining the wireless device should notify the network node of the tracking area update, transmitting a tracking area update.

In particular embodiments, the method further comprises obtaining a list of one or more TAIs and wherein determining whether the wireless device should notify the network node of the tracking area update comprises determining whether the second TAI is in the list of one or more TAIs.

In particular embodiments, upon determining the second TAI is in the list of one or more TAIs, the method comprises determining that the wireless device should not notify the network node of the tracking area update.

In particular embodiments, determining whether the wireless device should notify the network node of the tracking area update is based on one or more of a time delay from a time the wireless device received the second TAI and a minimum cell quality.

In particular embodiments, determining whether the wireless device should notify the network node of the tracking area update is based on one or more of: a geographic location of the wireless device; an amount of geographic movement of the wireless device over a time period; an amount of time in the first cell; an amount of time using the first TAI; an expected time of change from the first TAI to the second TAI; and an expected time of change from the first cell to a second cell.

In particular embodiments, the second TAI is received from the first cell or a second cell.

In particular embodiments, the method further comprises receiving a TAI broadcast schedule.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node operating in a non-terrestrial network comprises determining a list of one or more tracking area identities that will be valid in an earth moving cell over a period of time. Each of the one or more TAIs is associated with a fixed tracking area. The method further comprises transmitting the list of one or more TAIs to a wireless device in the cell.

In particular embodiments, the method further comprises broadcasting a first TAI in the cell, determining to broadcast a second TAI in the cell, and broadcasting the second TAI in the cell.

In particular embodiments, determining to broadcast the second TAI in the cell is based on one or more of an elapsed amount of time broadcasting the first TAI and a geographical position of the network node.

In particular embodiments, determining to broadcast the second TAI in the cell is based on receiving a tracking area update request from a wireless device.

In particular embodiments, the method further comprises transmitting one or more of a time delay and a minimum cell quality to a wireless device for the wireless device to determine whether to perform a tracking area update.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments may provide more efficient procedures for performing tracking area updates.

BRIEF DESCRIPTION OF THE DRAWINGS

For a more complete understanding of the disclosed embodiments and their features and advantages, reference is now made to the following description, taken in conjunction with the accompanying drawings, in which:

FIG. 14 is flowchart illustrating an example method in a network node, according to certain embodiments;

FIG. 15 illustrates a schematic block diagram of a wireless device and a network node in a wireless network, according to certain embodiments;

FIG. 21 is a flowchart illustrating a method implemented in a communication system, according to certain embodiments; and FIG. 22 is a flowchart illustrating a method implemented in a communication system, according to certain embodiments.

DETAILED DESCRIPTION

Figure 1:
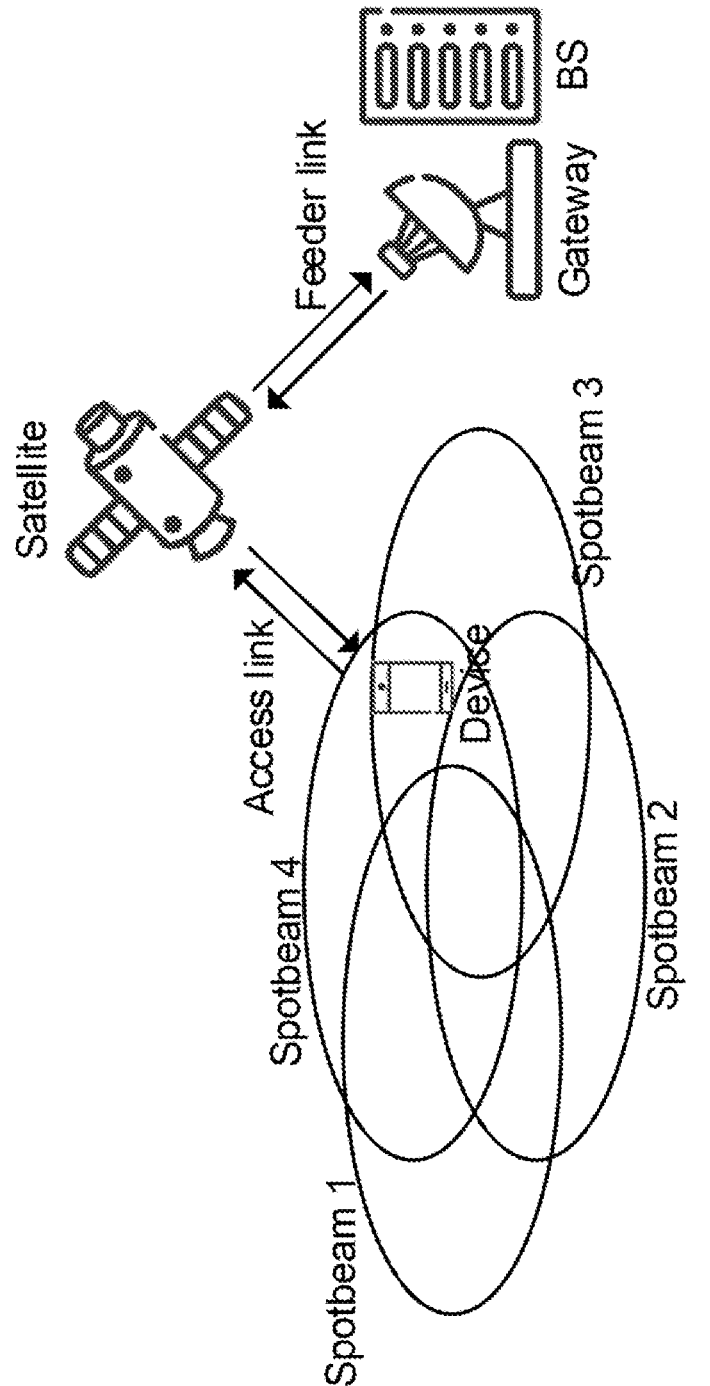
FIG. 1 illustrates an example architecture of a satellite network with bent pipe transponders.
Figure 2:
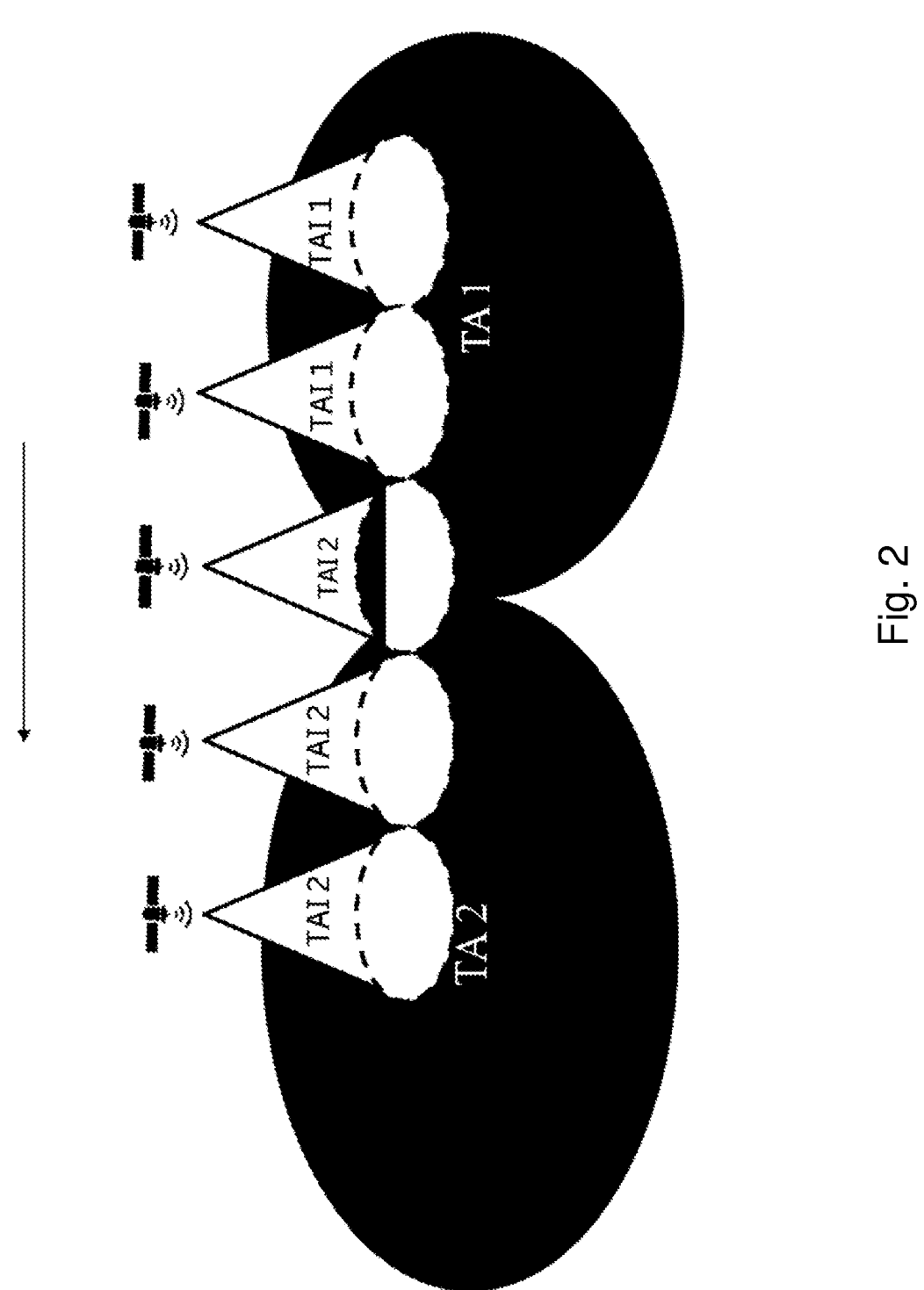
FIG. 2 is a timing diagram illustrating an example tracking area update for earth moving beams with hard TAI update.
Figure 3:
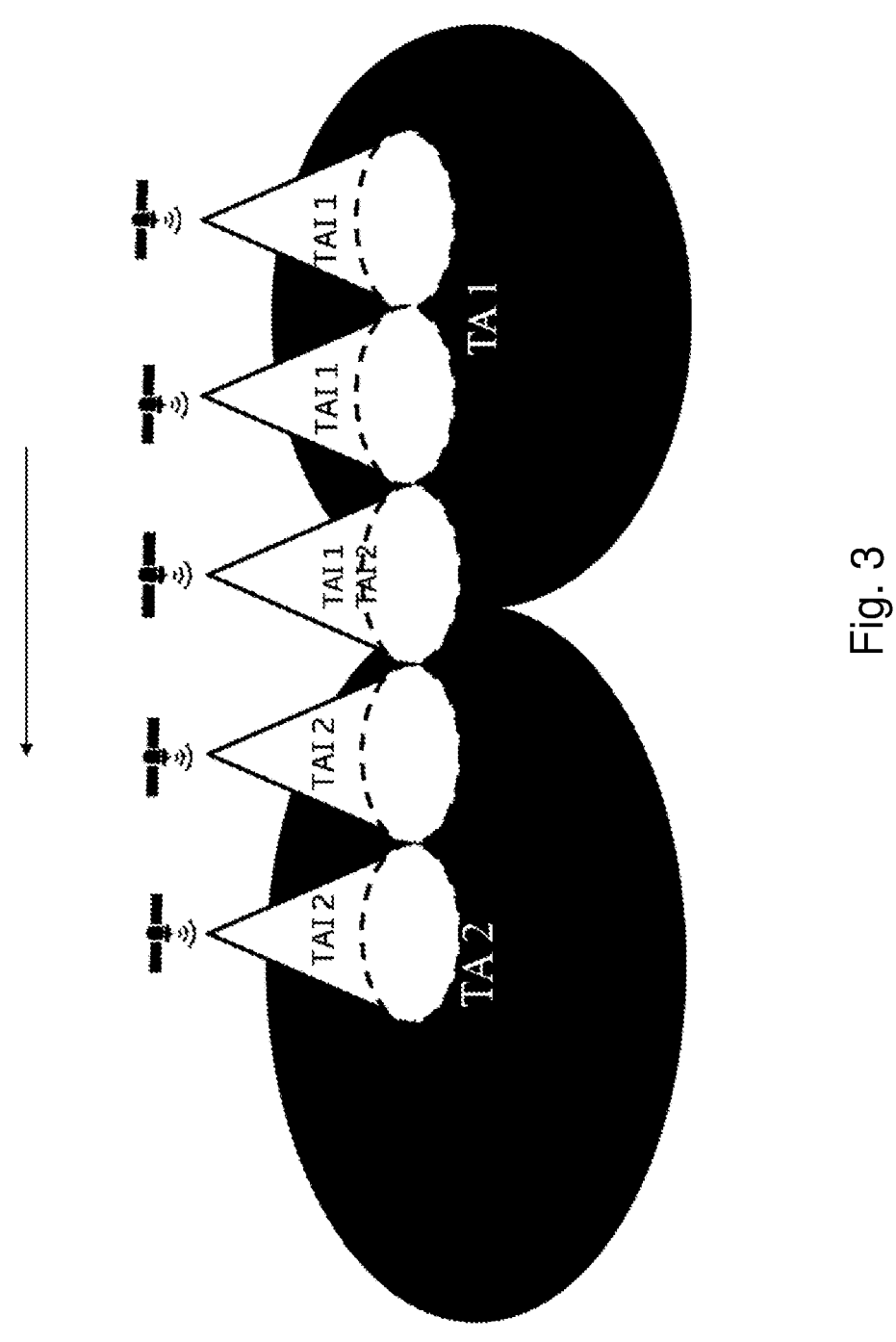
FIG. 3 is a timing diagram illustrating an example tracking area update for earth moving beams with soft TAI update.

Based on the description above, certain challenges currently exist with tracking area updates for non-terrestrial networks (NTNs). Certain aspects of the present disclosure and their embodiments may provide solutions to these or other challenges. For example, particular embodiments manage earth-fixed tracking areas in systems with moving cells. Particular embodiments include delaying and/or controlling a user equipment (UE) sending registration updates when a tracking area identifier (TAI) changes, and reducing the next generation application protocol (NGAP) signalling between gNB and the access and mobility management function (AMF) when the TAIs broadcast by a gNB change over time.

The terms beam and cell may be used interchangeably herein, unless explicitly noted otherwise. Particular embodiments are described with respect to NTN, but particular embodiments may apply to any wireless network dominated by line of sight conditions.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments described herein may be combined, used in parallel or even assisting and/or augmenting each other. The embodiments described herein are primarily described in terms of tracking areas (TAs), lists of TAIs and, when paging is concerned, core network-initiated paging. However, through generalization, extension, adaptation and/or modification, when needed, the embodiments may also be applicable to the corresponding concepts and mechanisms associated with the radio access network (RAN), e.g. RAN areas (identified by RAN area codes), which can be used to configure RAN-based notification areas (RNAs), and RAN initiated paging.

Some embodiments include hard TAI switching. Particular embodiments include actions for a UE that is camping on a cell that updates its broadcasted TAI, e.g., from TAI1 to TAI2. In some embodiments, the UE does not trigger update of the registration area (i.e., does not trigger sending a Registration Request non-access stratum (NAS) message with the "5GS registration type" IE set to "mobility registration updating" in new radio (NR) or a tracking area update (TAU) Request in long term evolution (LTE)), even if TAI2 does not belong to UE's registration area. One reason is because this is a moving cell scenario and the next cell that is still broadcasting TAI1 will cover the location on Earth relatively soon. Another reason is that if the UE is paged in two tracking areas, the paging capacity may become limited because the NTN cells are large.

In some embodiments, a UE determines whether it does registration area update or not based on its geographical location. In some embodiments, the UE determines whether it does TAU or not based on dwell time in the cell which may also be referred to as time_left_service or expected (remaining) time to be served. In some embodiments, the UE determines whether to perform registration area update based on the expected time from the change of TAI until the previous TAI will be broadcast over the UE's location again in a new cell covering the location. As an option, this triggers UE to perform RRC_IDLE mode measurements as it is an indication that this geographical area is going to be replaced by another cell.

In some embodiments, earth-fixed tracking areas (TAs), hard TAI switching (a single TAI broadcast per cell at a time) and moving cells are combined. In this scenario, a UE located near the border between TAs will often be in a situation where the TAI that is broadcast switches back and forth between two TAIs (where the switches occur when the UE reselects to the new cell moving in to cover the UE's location and/or when the cell the UE is camping on switches its TAI), even though the UE itself is stationary. This is illustrated by FIGS. 4-6.

Figure 4:
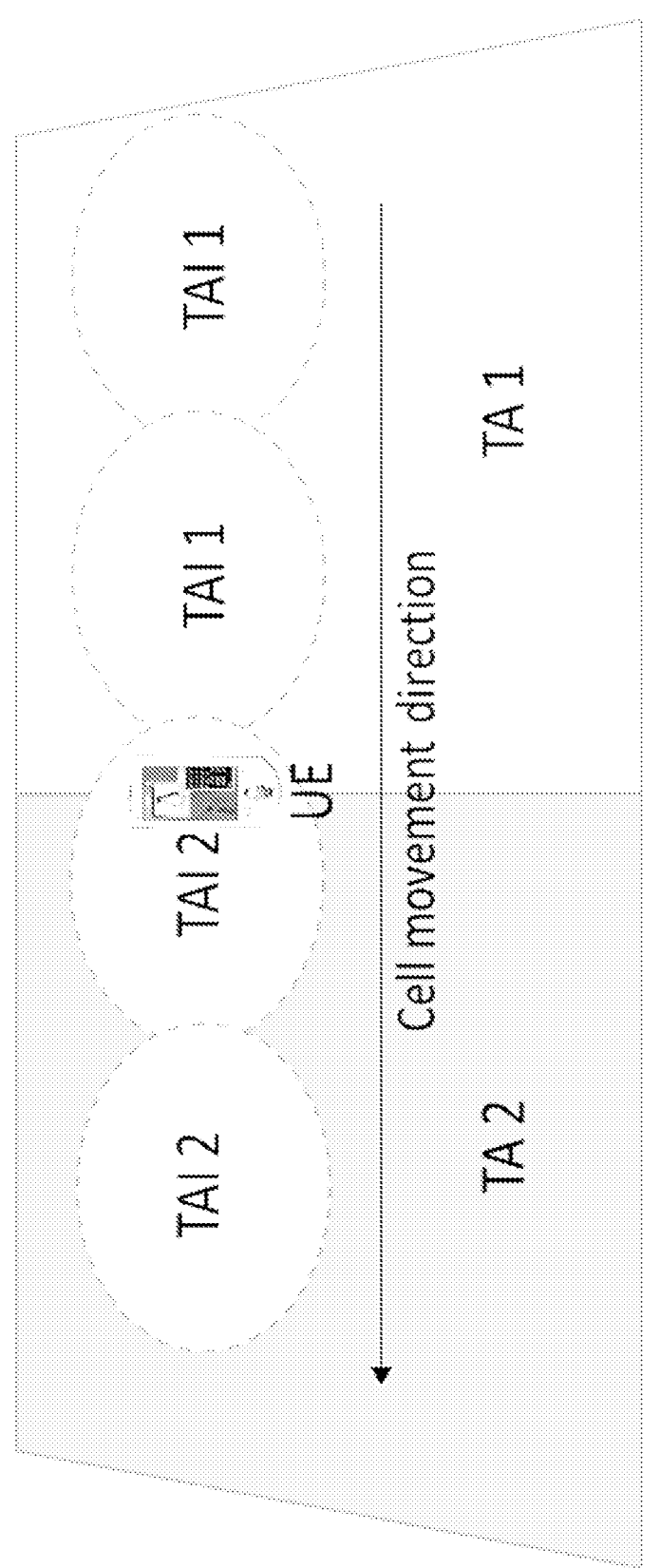
FIGS. 4-6 are a timing diagram illustrating a stationary UE that receives a broadcasted TAI that switches back and forth between two TAIs.
Figure 5:
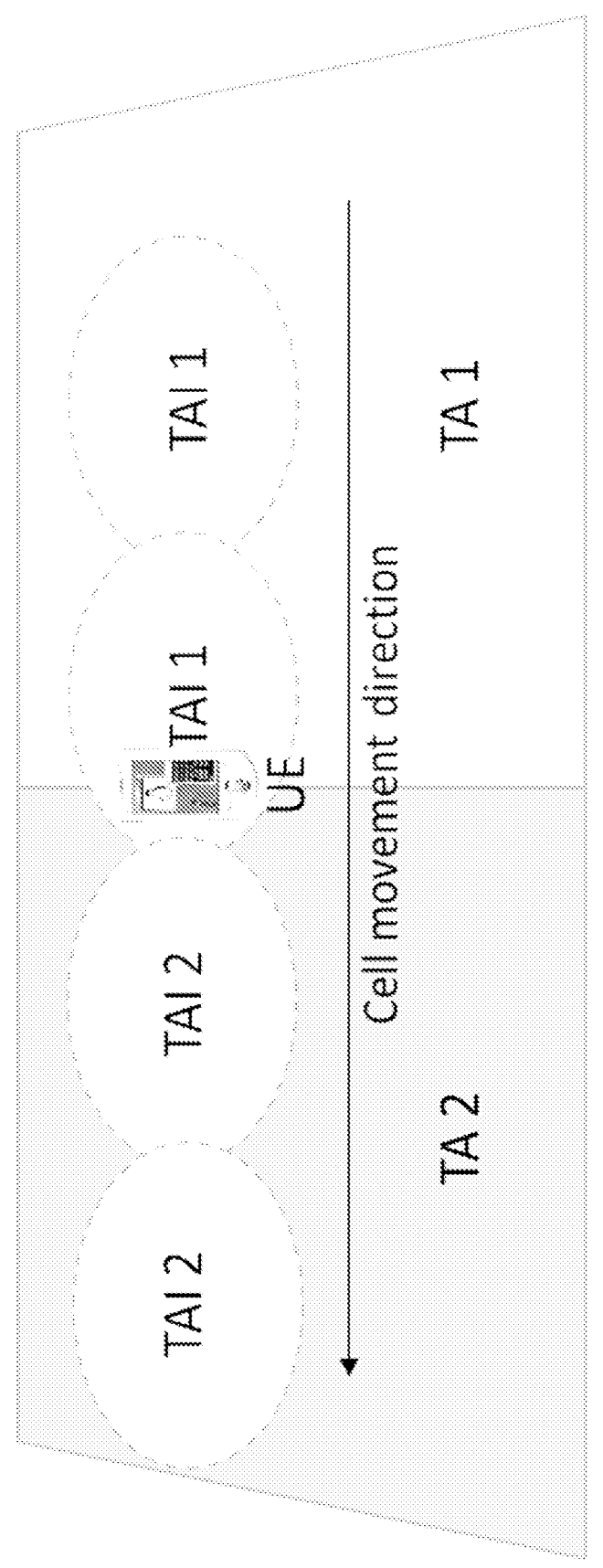
Figure 6:
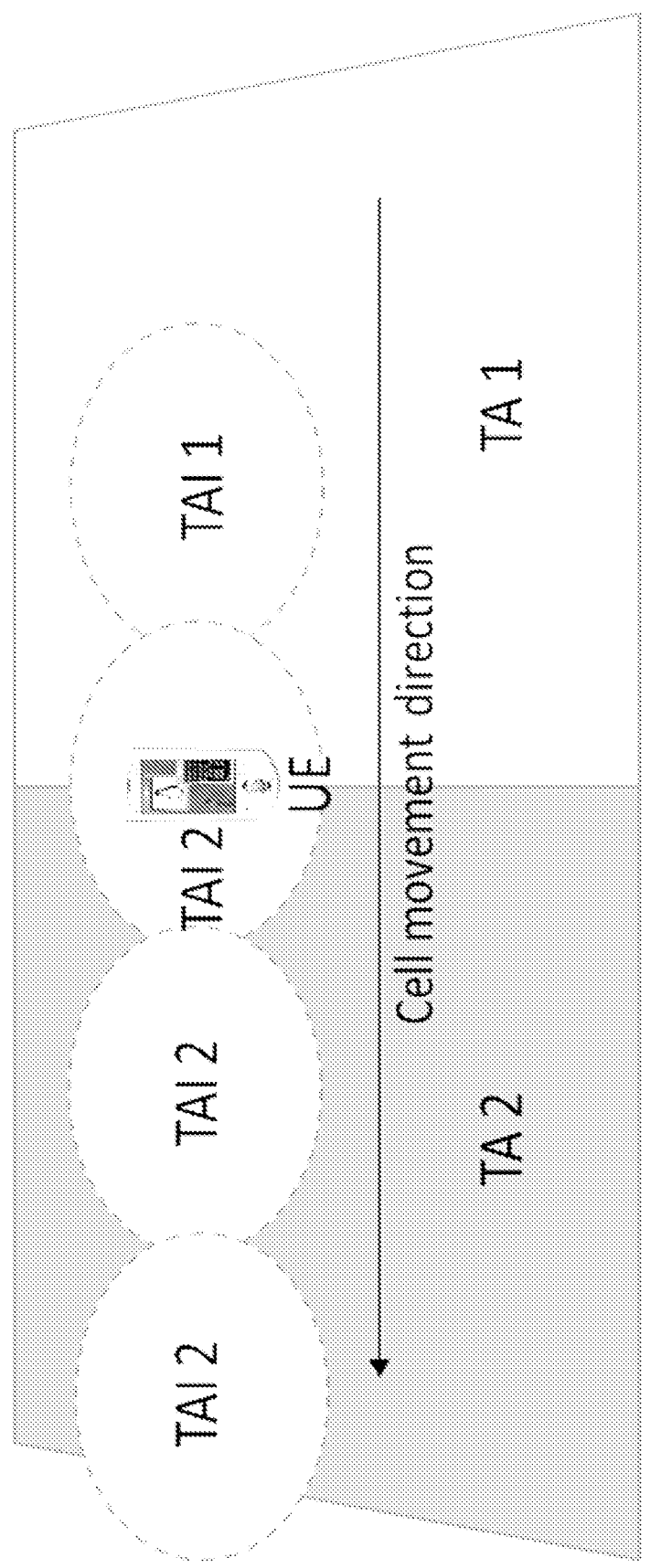

FIGS. 4-6 are a timing diagram illustrating a stationary UE that receives a broadcasted TAI that switches back and forth between two TAIs. In FIG. 4 the UE receives TAI 2. As the cells moves from right to left and the UE reselects to a new cell, the UE receives TAI 1 from the next cell that has not yet changed the TAI that it is broadcasting, as illustrated in FIG. 5. In FIG. 6, the cell has updated its TAI and now broadcasts TAI 2 to the UE.

As another example, some scenarios may include three TAIs that are broadcast on the UE's location. An example is illustrated in FIGS. 7-10.

Figure 7:
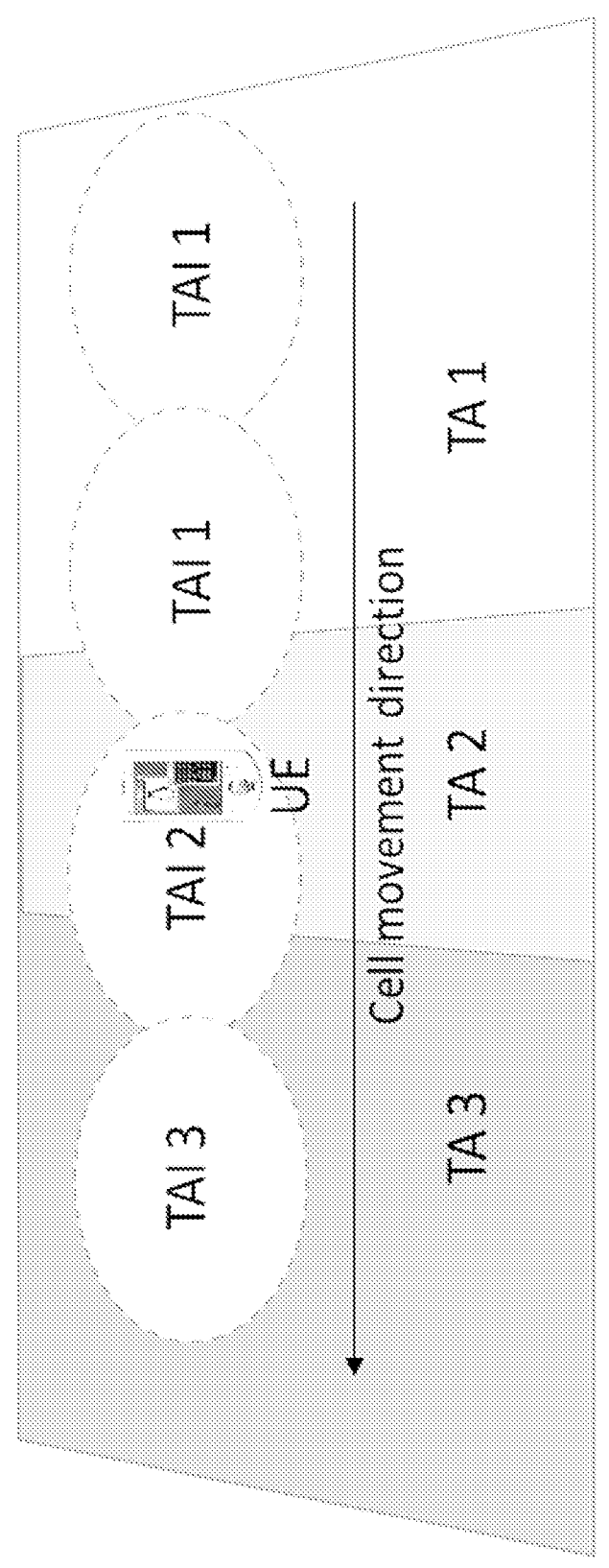
FIGS. 7-10 are a timing diagram illustrating a stationary UE that receives a broadcasted TAI that switches between three TAIs.
Figure 8:
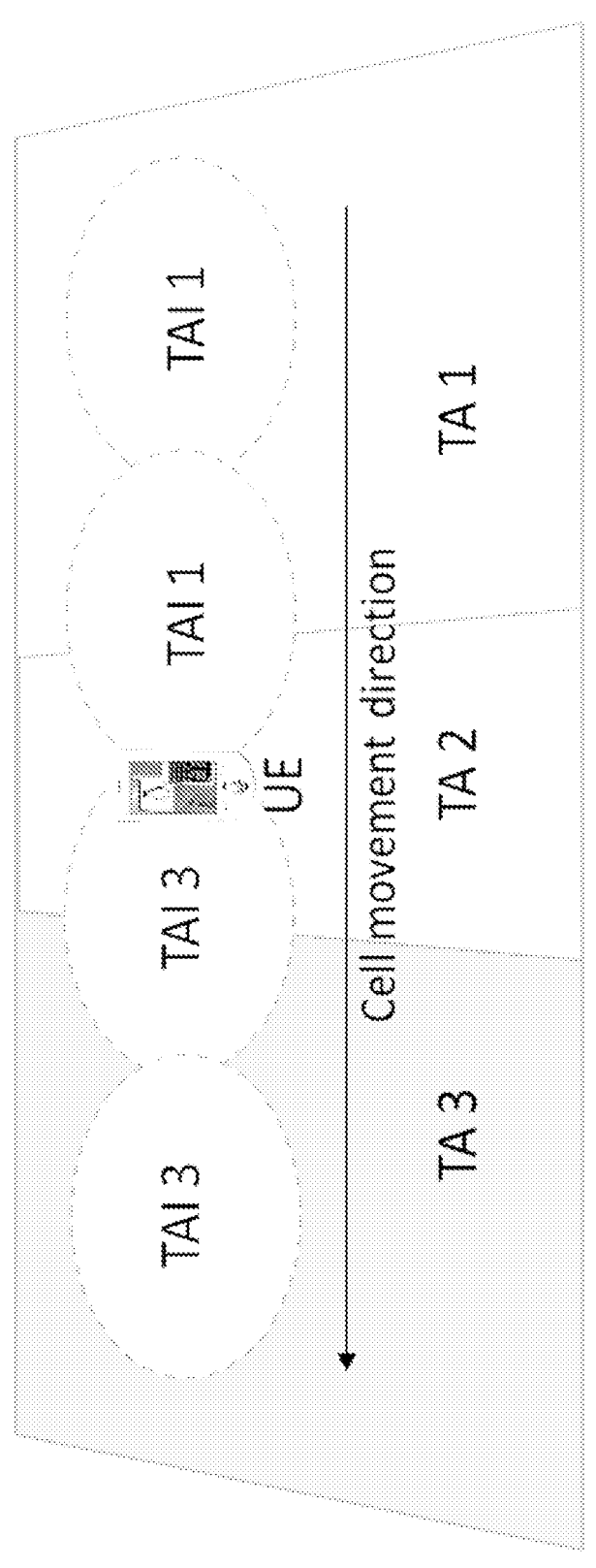
Figure 9:
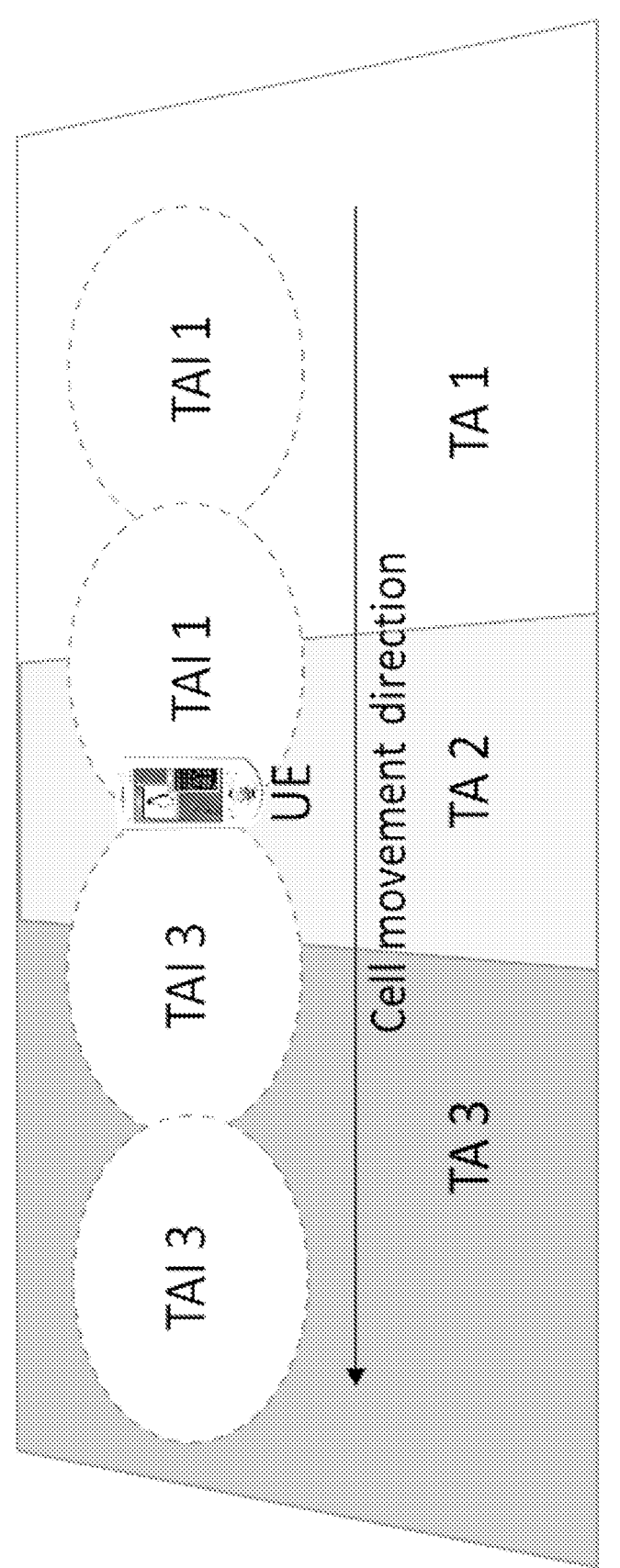
Figure 10:
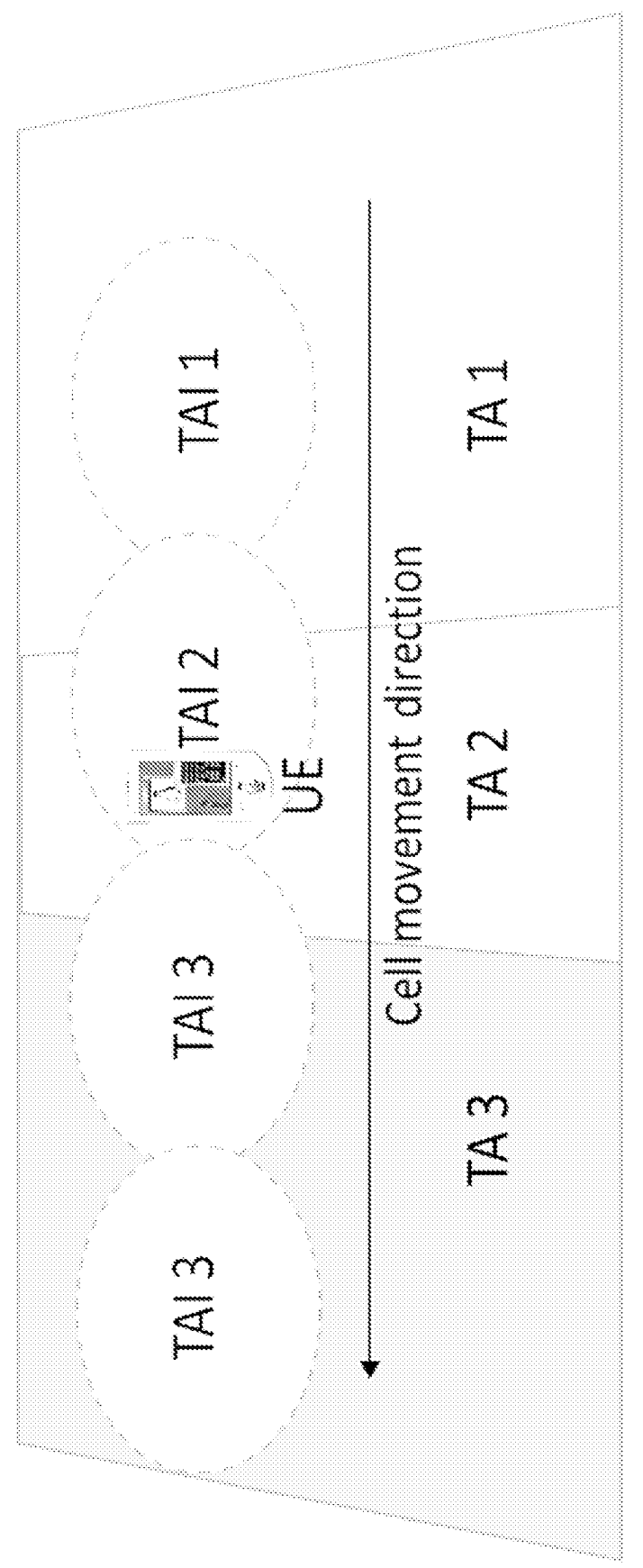

FIGS. 7-10 are a timing diagram illustrating a stationary UE that receives a broadcasted TAI that switches between three TAIs. In FIG. 7, the UE receives TAI 2. In FIG. 8, the cell has switched to TAI 3 and the UE receives TAI 3. In FIG. 9 the UE has reselected to a new cell that is still broadcasting TAI 1. In FIG. 10, the new well updates its TAI to TAI 2, and the UE again receives TAI 2.

These scenarios, when the TA List (Registration Area) in the UE does not include all TAIs, cause the UE to send unnecessarily frequent Registration Request messages to update the network's awareness of the UE's location (for which a Registration Request NAS message with the "5GS registration type" IE set to "mobility registration updating") (corresponding to a Tracking Area Update (TAU) Request in LTE).

To avoid this, in some embodiments the UE leverages the property that NTN cells typically have a slowly degrading channel quality at the cell edge. This means that the UE can remain camping in a cell that is leaving the UE's location while waiting for the new cell to move in far enough over the UE's location that it switches its TAI to the one the UE's current cell is broadcasting. This works in some scenarios where the TAI broadcast at the UE's location would otherwise switch back and forth between two TAIs, as described above with respect to FIGS. 4-6. The UE thus delays its cell reselection longer than the regular cell reselection rules and procedures would otherwise result in.

For example, in FIGS. 4-6, the UE would delay its cell reselection between FIG. 4 and FIG. 5 until the new cell switches its TAI from TAI 1 to TAI 2, as in FIG. 6. This way the UE avoids having to send a Registration Request message to the network (to perform a registration area update) when it reselects to a cell broadcasting a different TAI.

This behavior may be UE autonomous or configured by the network. Such a configuration may indicate that the UE should apply the described behavior when possible, but the configuration may also include a channel quality offset (e.g., a reference signal receive power (RSRP) offset) that the UE should apply and that indicates how much worse the current cell's quality can be than the new cell's quality before the UE has to reselect to the new cell, even if the new cell has not switched its TAI to the UE's current TAI yet. With such a configuration, the UE, as one option, reselects to the new cell when the new cell has switched to the UE's current TAI (and the new cell fulfils the regular cell reselection conditions) or when the UE's current cell's quality becomes offset worse than the new cell's quality, whichever happens first.

As an alternative to an offset between the cell qualities, or in addition to an offset between cell qualities, the configuration may include a minimum quality (e.g., in terms of RSRP) that the current cell must exceed for the UE to withhold its cell reselection to the new cell. Thus, as one option, the UE would reselect to the new cell when the new cell has switched to the UE's current TAI (and the new cell fulfils the regular cell reselection conditions) or its current cell's quality goes below the configured minimum quality, whichever happens first.

Another countermeasure against frequent registration area updates (i.e., frequent transmissions of Registration Request messages) in the above illustrated scenarios, which is applicable both in scenarios where the TAI broadcast in the UE's location switches back and forth between two TAIs and in scenarios where the TAI broadcast in the UE's location switches sequentially between three different TAIs, is that the UE provides assisting information to enable the network to construct TAI lists for the UE that includes both or all the TAIs that will in turn be broadcast over the UE's location. Such assisting information may for example include a Registration Request message where the UE includes an indication of whether the TAU is caused (primarily) by cell movements and cell TAI switches or by UE movements (and may complement this with an indication of the TAI of the last visited cell, i.e. the cell from which the UE reselected. As one option, the UE may indicate whether its own movement since the last registration area update has been significant or if the distance the UE has moved can be neglected (e.g., the UE has been stationary) in relation to the cell movements).

When receiving such assisting information, e.g., in a Registration Request message, the core network may use the assisting information to create, and allocate to the UE, a new list of TAIs (in the Registration Accept message sent in response to the Registration Request message) that includes both the UE's old and the new TAI (i.e., the TAI broadcast in the UE's old (last visited) cell and the TAI broadcast in the UE's new cell).

In some embodiments where earth-fixed tracking areas (TAs), hard TAI switching (a single TAI broadcast per cell at a time) and moving cells are considered, the UE initiates a Registration Request/Tracking Area Update (TAU), only if the new TAI, even though the UE is still camping in the same cell, is not in the TAI List. Each time the UE encounters a new TAI, the UE performs a Registration Request/Tracking Area Update once so that the AMF/MME adds the newly registered TAI to the TAI List.

Some embodiments include soft TAI switching. In particular embodiments, a UE does not perform TAU as long as the UE sees a TAI that belongs to the list of TAIs with which the UE is configured. The UE may initiate a Registration Request/Tracking Area Update (TAU) if the new TAI is not in the TAI List. When the UE encounters a new TAI, the UE may perform a registration update/tracking area update so that the AMF/MME adds the newly registered TAI to the TAI List.

In some embodiments, when the UE receives updated system information (SI) that has TAI2 added in addition to TAIL the UE is prepared to make registration update (TAU) for TAI2 if it is not in the UE's current list of TAIs defining the UE's current registration area. Because TAU1 and TAI2 may be associated with validity times, the UE knows when it needs to make the registration area update (i.e., send a Registration Request NAS message with the "5GS registration type" IE set to "mobility registration updating" in NR or a TAU Request in LTE) given the UE is still camping in this cell. In another option, the update in system information may trigger the UE to perform cell reselection measurements because it indicates the cell is about to move from the UE's reach.

With moving cells combined with geographically fixed TAs, the TAI(s) broadcast in a cell's system information change rather frequently. In addition, the times when the TAIs should change are tied to the cell's current location in relation to the geographically fixed TAs. This is a bad match with the existing rules and mechanisms for updating the system information, which stipulate that updates can only be executed at the borders between system information modification periods and an upcoming change should be announced using "Short Messages" (with the systemInfo-Modification parameter set to 1) in downlink control information (DCI) addressed to the paging radio network temporary identifier (P-RNTI) on the physical downlink control channel (PDCCH) during the system information modification period preceding the update.

One problematic aspect is that the points in time when the TAI should be changed might not coincide well with system information modification period borders. In addition, there will be frequent system information updates, which increases the control signaling load and forces the UEs to retrieve the updated system information more often than otherwise would have been needed.

To avoid this problem, particular embodiments provide more extensive and proactive information in the system information. In some embodiments, the gNB includes in the system information, not only the current TAI(s), but also other TAIs that will be valid in the cell (i.e., associated with the cell) during some time periods, as well as the time periods during which the respective TAIs will be valid. If the system information includes a sequence of TAIs (for TAs along the moving cell's trajectory) and the time periods during which the respective TAI will be (or is) valid in the moving cell, the system information updates caused by changing of TAIs in the cell will be much less frequent.

If the "TAI validity schedule" covers the cell's entire lap around the earth, changes of TAIs would ideally not cause any system information updates, because they will all be predictable according to the complete TAI validity schedule. However, in practice, the satellites' orbits are not perfectly stable, so after a longer period of time, the TAI validity schedule may not be sufficiently accurate anymore with regards to the times that the TAIs should ideally be switched (with the relation to the geographically fixed TAs), which consequently eventually will cause a need to update the TAI validity time periods in the TAI validity schedule.

In some embodiments, the problem of matching the timing of TAI changes in the system information with the ideal points in time for the changes is solved by excluding TAI changes in the system information from the regular system information update restrictions. This can be achieved using a new indicator in the "Short Message" conveying the system information update notifications to the UEs. This may be a parameter specifically indicating that the TAI has been updated and it would trigger the UE to immediately (or as soon as possible) acquire the new TAI, e.g., by receiving the relevant part of the system information, e.g. SIB1, the next time it is broadcast.

As an alternative, the new parameter in the "Short Message" may be a general indicator to a receiving UE that the system information has been updated and that the UE should acquire the updated system information immediately (or as soon as possible) without waiting for the next system information modification border (because the concerned update of the system information has been executed independently of the system information update periods). To further simplify the acquisition of the new TAI, in one embodiment, the "Short Message" notifying the UEs about the update contains the actual new TAI, so that a receiving UE does not have to receive the system information to acquire the new TAI.

In another embodiment for moving cell beams, broadcasting multiple tracking areas uses the SIB structure introduced for NR in Rel-15 RAN sharing with multiple cell-ID broadcast, where each cell ID is associated with a single TAC only. Therefore, multiple tracking area broadcast is realized with broadcast of multiple cell ID, each tracking area associated with a separate cell ID. Because the geographical area mapped to each of the tracking areas map to disjoint sets of cell areas, such approach results in cell/tracking area grid made up of fixed geographical areas.

If frequent system information update notifications are to be avoided, a UE located in a certain geographical area corresponding to a fixed cell area may receive broadcast information that contains multiple cell ID/tracking area information, corresponding to the geographical area over which the satellite beam is sweeping. Each cell ID/tracking area pair is accompanied with timing information indicating at which point in time at least a part of the satellite beam sweeps over a geographical area corresponding to the (fixed earth) location of the cell area/tracking area.

If a beam sweeps over a fixed cell area broadcasting cell IDs/tracking areas corresponding to the geographical area it sweeps over and the UE observes a complete beam sweep over its current geolocation, it can deduce the cell ID/tracking area pair that is valid over the whole time period it is connected to the beam/service link. If the system requirement does not allow the UE to wait for a complete sweep of the beam before initiating, e.g., the registration procedure, the UE would need to either be pre-configured with the cell/tracking area grid or the beam accompanies the cell/tracking area ID with (fixed earth) geographical coordinates of the cell (e.g., the cell center) that the UE would need to correlate with its own location. Selecting the proper tracking area is important, e.g., on country borders, and/or the UE is allowed to be served in a limited service area only.

Some embodiments include the core network. Particular embodiments include signaling support from gNB to the access and mobility management function (AMF).

Because the TAIs that the gNB will broadcast in is constantly moving and shifting cells, as well as the time periods when they will be broadcast, are predictable, the gNB can transfer a "TAI broadcast schedule" to the AMF, which will be valid for a long time (limited only by the accuracy with which the satellites stick to their planned orbits). Ig the AMF sends a paging message to a gNB that does not broadcast the concerned TAI (despite the transferred scheduled or if some less reliable solution than TAI broadcast schedules is used), the gNB responds to the AMF that it does not (at least not currently) support that TAI and did not transmit any paging message to the UE so that the AMF does not waste time waiting for a response from the UE.

In a variant, the gNB may include in the response that it did not transmit the paging message because it is about to stop broadcasting the specific TAI. Or, the gNB informs the AMF on when it can page the UE if the gNB does not yet broadcast the TAI. In this embodiment, the AMF can send the paging message to gNBs that are broadcasting or about to broadcast the TAI. Or the AMF can send the paging message to a gNB that will broadcast the TAI with a timer so that when the timer expires the gNB discards the request if it has not yet broadcasted the TAI. In a variant, the gNB informs the AMF that it was not possible for the gNB to transmit the paging message in the intended TA before the configured timer expired. Or regardless of whether such timer is configured, the AMF informs the gNB if it has managed to reach the UE so that there is no need to transmit the paging message if it has not started to broadcast the TAI yet.

Some embodiments include relieving the AMF from gNBs TA(s) support time relation. The gNB provides coverage for a limited geographical area that changes over time. During some periods of time the coverage includes complete or portions of multiple Tracking Areas. Thus, the gNB configuration exposed to the AMF at NG setup can include all such tracking areas. At paging process, the AMF can send paging message to all gNBs that are configured with the TA(s) where the UE is intended to be paged, e.g., the subset of TAs that constitute UE's RA. As an example, this can be all gNBs in a country, or it can be all gNBs on a certain area the AMF is planned to cover. Given that all gNBs can be aware when in time they cover certain TA(s), only the gNBs will page over the radio interface that by the time of paging provide coverage to the TA(s) indicated in the paging message. This approach relieves the AMF from being aware of the gNB's TA(s) coverage time relation.

The gNBs that did not page the UE (e.g., because they do not broadcast the TAI at that moment) will thus simply ignore (drop) the paging request from AMF. Alternatively, those gNB may reply to AMF as described in the previous embodiment, to let AMF know that the UE was not paged by that gNB.

The same principle applies in case of RAN paging, where a UE in RRC_INACTIVE is paged in a RAN notification area that my consist of cells or tracking areas. If a gNB does not currently serve one of the cells/tracking areas contained in the RAN notification area, it ignores that currently-non-served part of the RAN notification area.

Figure 11:
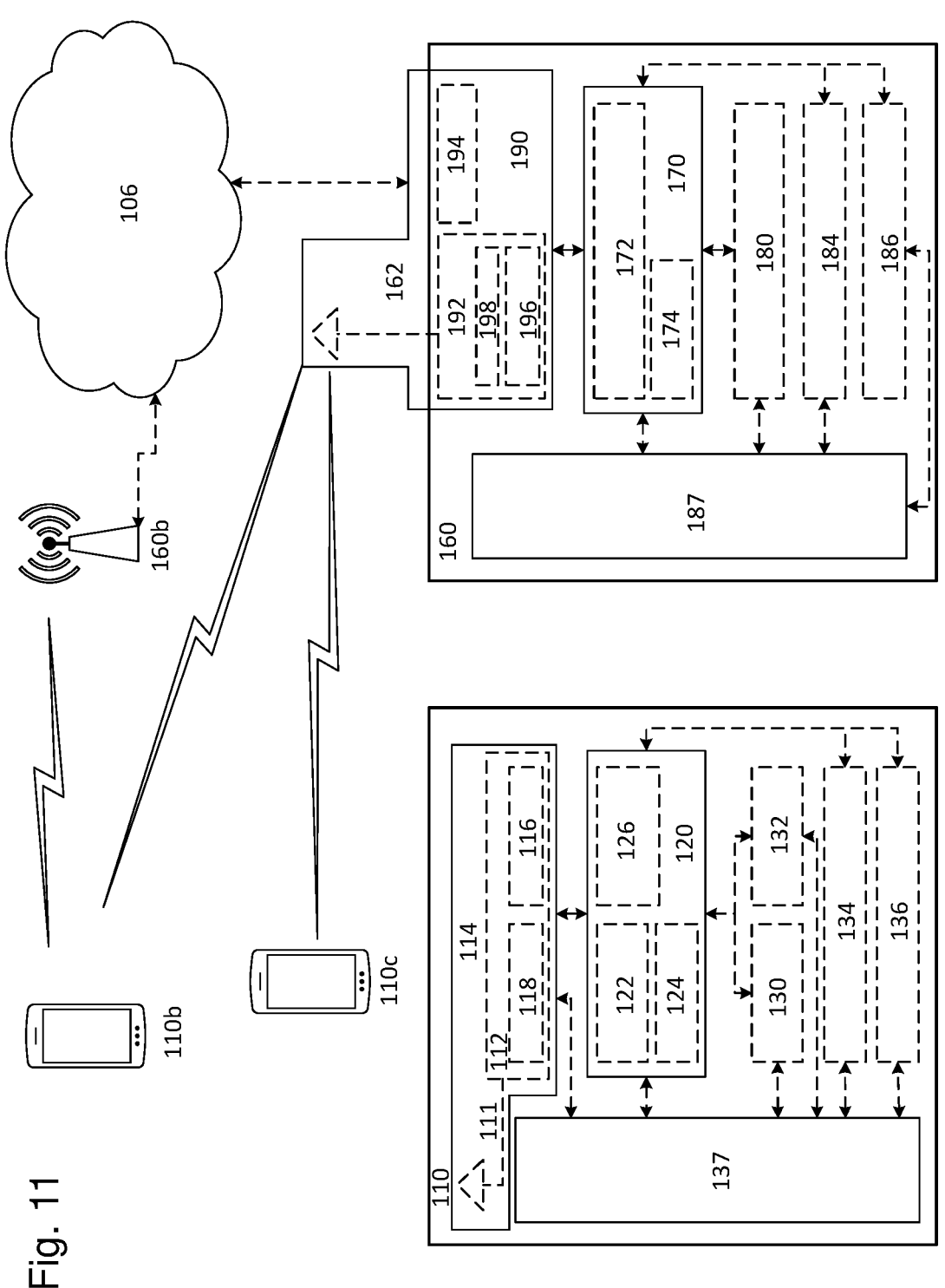
FIG. 11 is a block diagram illustrating an example wireless network.

FIG. 11 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 160 includes processing circuitry 170, device readable medium 180, interface 190, auxiliary equipment 184, power source 186, power circuitry 187, and antenna 162. Although network node 160 illustrated in the example wireless network of FIG. 11 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 11 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 12:
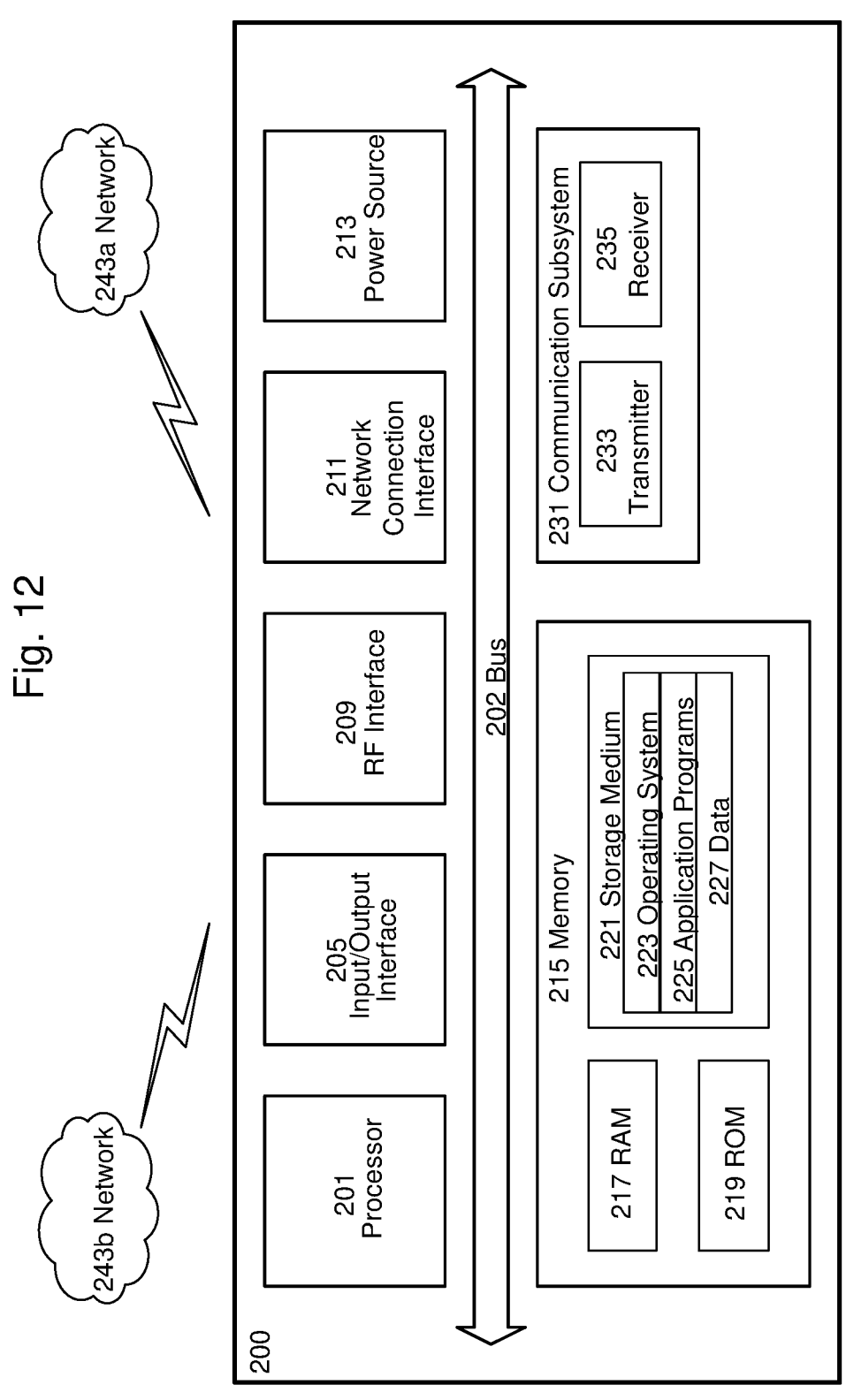
FIG. 12 illustrates an example user equipment, according to certain embodiments.

FIG. 12 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3<sup>rd</sup> Generation Partnership Project (3GPP), including a NB-IoT UE, a machine type communication (MTC) UE, and/or an enhanced MTC (eMTC) UE. UE 200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 12, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 13:
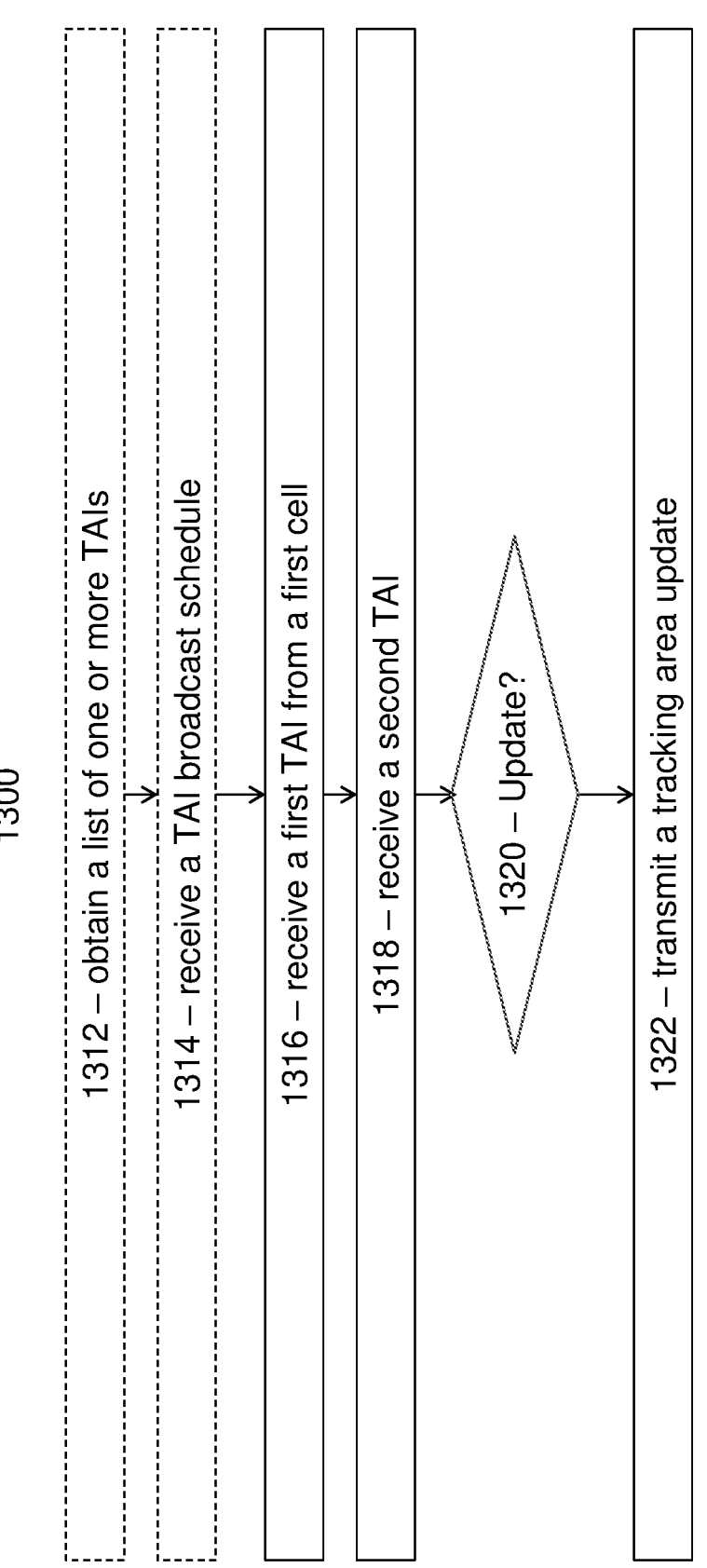
FIG. 13 is flowchart illustrating an example method in a wireless device, according to certain embodiments.

FIG. 13 is a flowchart illustrating an example method in a wireless device, according to certain embodiments. In particular embodiments, one or more steps of FIG. 13 may be performed by wireless device 110 described with respect to FIG. 11.

The method may begin at step 1312, where the wireless device (e.g., wireless device 110) obtains a list of one or more TAIs. For example, the list of one or more TAIs may comprise a list of one or more TAIs that will be valid in an earth moving cell over a period of time. The wireless device may use the list in a later step to determine whether the wireless device should notify the network node of a tracking area update.

At step 1314, the wireless device may receive a TAI broadcast schedule. For example, system information modification periods may not coincide with the times an earth moving cell should update its broadcast TAI. Thus, the wireless device may receive a TAI broadcast schedule indicating when to expect TAI changes and based on the schedule the wireless device may receive an updated TAI either via system information, partial system information, or any other suitable update, or the wireless device may request a TAI from the network according to any of the embodiments and examples described above.

At step 1316, the wireless device receives a first tracking area identity from a first cell. The first cell is an earth moving cell and the first TAI is associated with a first fixed tracking area. An example is illustrated in FIG. 4, where the UE receives TAI 2.

At step 1318, the wireless device receives a second TAI. The second TAI is associated with a second fixed tracking area. An example is illustrated in FIG. 5, where the UE receives TAI 1.

At step 1320, the wireless device determines whether the wireless device should notify a network node of a tracking area update based at least in part on information related to the second TAI. In particular embodiments, the wireless device determines whether the second TAI is in the list of one or more TAIs obtained at step 1312. If the second TAI is one of the TAI in the list, then the wireless device does not need to send an update.

In particular embodiments, determining whether the wireless device should notify the network node of the tracking area update is based on one or more of a time delay from a time the wireless device received the second TAI and a minimum cell quality. For example, as described in the embodiments an examples above, a wireless device may delay performing a cell reselection for an amount of time or delay until a minimum cell quality threshold is reached. A benefit is that the new cell has likely updated its broadcast TAI at that time so that the second TAI is the same as the first TAI and no TAI update is needed.

In particular embodiments, determining whether the wireless device should notify the network node of the tracking area update is based on one or more of: a geographic location of the wireless device; an amount of geographic movement of the wireless device over a time period; an amount of time in the first cell; an amount of time using the first TAI; an expected time of change from the first TAI to the second TAI; and an expected time of change from the first cell to a second cell, according to any of the embodiments and examples described above.

In some embodiments, the determination includes any combination of one or more of the preceding examples.

If the wireless device determines a TAI update is needed, the method continues to step 1322, where the wireless device transmits a tracking area update.

Modifications, additions, or omissions may be made to method 1300 of FIG. 13. Additionally, one or more steps in the method of FIG. 13 may be performed in parallel or in any suitable order.

FIG. 14 is a flowchart illustrating an example method in a network node, according to certain embodiments. In particular embodiments, one or more steps of FIG. 14 may be performed by network node 160 described with respect to FIG. 11.

The method begins at step 1412, where a network node (e.g., network node 160) determines a list of one or more TAIs that will be valid in an earth moving cell over a period of time. For example, with respect to FIG. 4, a network node may determine that the UE may receive TAI 2 and also briefly receive TAI 1 when an earth moving cell is in transition between tracking areas. Thus, the network node may include TAI 2 and TAI 1 in a list.

At step 1414, the network node transmits the list of one or more TAIs to a wireless device in the cell. The wireless device may later use the list to determine whether the wireless device should notify the network node of the tracking area update.

At step 1416, the network node may transmit one or more of a time delay and a minimum cell quality to a wireless device. For example, as described in the embodiments and examples above, a wireless device may delay performing a cell reselection for an amount of time or delay until a minimum cell quality threshold is reached. A benefit is that the new cell has likely updated its broadcast TAI at that time so that the second TAI is the same as the first TAI and no TAI update is needed. The delay and quality threshold may be configured by the network node.

At step 1418, the network node broadcasts a first TAI in the cell. An example is illustrated in FIG. 7 where the UE receives TAI 2.

At step 1420, the network node determines to broadcast a second TAI in the cell. An example is illustrated in FIG. 8 where the earth moving cell is transitioning to earth fixed tracking area 3.

At step 1422, the network node broadcasts the second TAI in the cell (e.g., FIG. 8).

Modifications, additions, or omissions may be made to method 1400 of FIG. 14. Additionally, one or more steps in the method of FIG. 14 may be performed in parallel or in any suitable order.

FIG. 15 illustrates a schematic block diagram of two apparatuses in a wireless network (for example, the wireless network illustrated in FIG. 11). The apparatuses include a wireless device and a network node (e.g., wireless device 110 and network node 160 illustrated in FIG. 11). Apparatuses 1600 and 1700 are operable to carry out the example methods described with reference to FIGS. 13 and 14, respectively, and possibly any other processes or methods disclosed herein. It is also to be understood that the methods of FIGS. 13 and 14 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, determining module 1604, transmitting module 1606, and any other suitable units of apparatus 1600 to perform corresponding functions according one or more embodiments of the present disclosure. Similarly, the processing circuitry described above may be used to cause determining module 1704, transmitting module 1706, and any other suitable units of apparatus 1700 to perform corresponding functions according one or more embodiments of the present disclosure.

As illustrated in FIG. 15, apparatus 1600 includes obtaining module 1602 configured to obtain list of one or more TAIs and receive broadcast TAIs according to any of the embodiments and examples described herein. Determining module 1604 is configured to determine whether to perform a tracking area update according to any of the embodiments and examples described herein. Transmitting module 1606 is configured to transmit tracking area updated according to any of the embodiments and examples described herein.

As illustrated in FIG. 15, apparatus 1700 includes determining module 1704 configured to determine a list of one or more tracking area identities that will be valid in an earth moving cell over a period of time and to determine when to update a broadcast TAI according to any of the embodiments and examples described herein. Transmitting module 1706 is configured to transmit TAI and TAI configuration information to a wireless device according to any of the embodiments and examples described herein.

Figure 16:
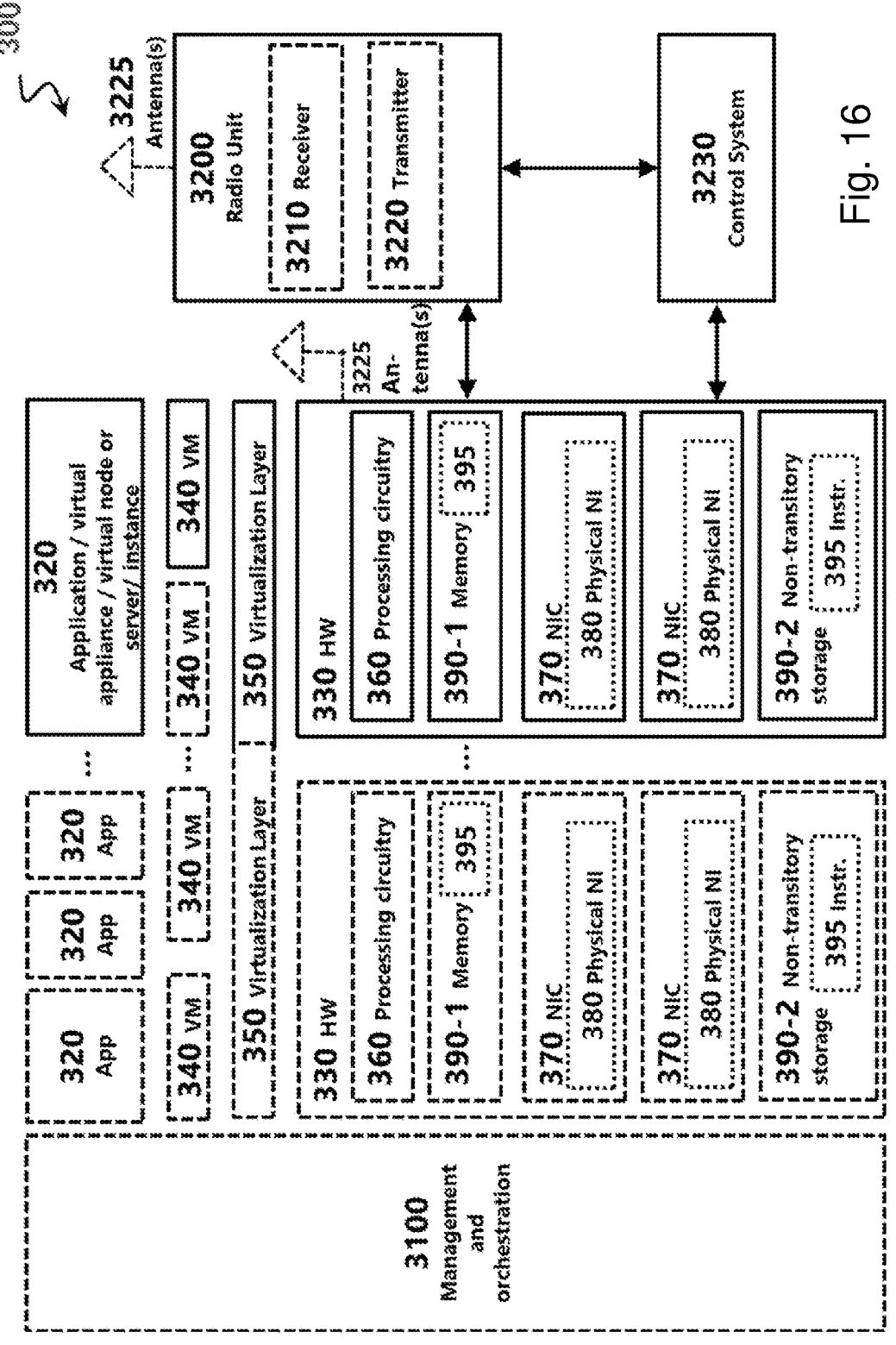
FIG. 16 illustrates an example virtualization environment, according to certain embodiments.

FIG. 16 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 16, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
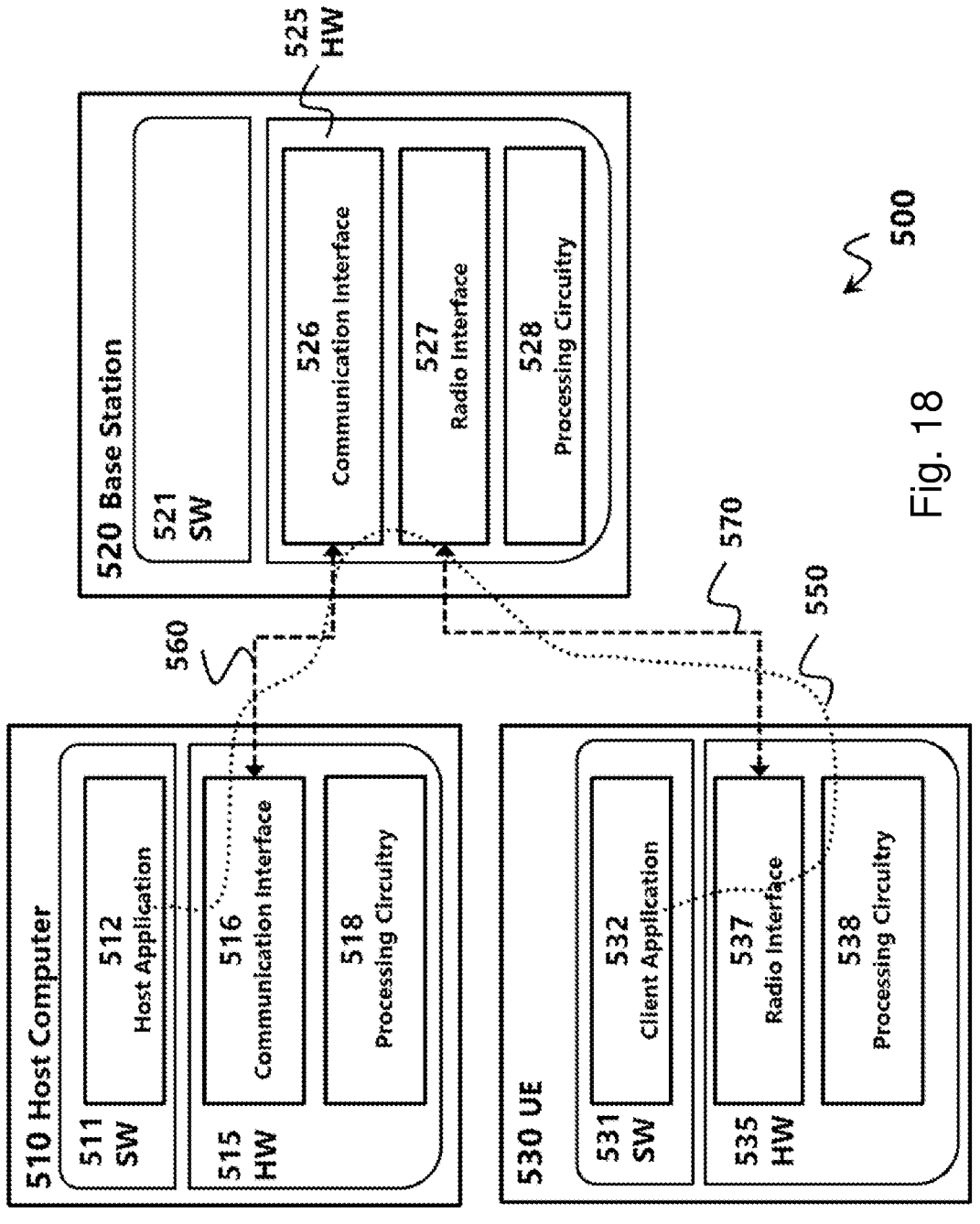
FIG. 18 illustrates an example host computer communicating via a base station with a user equipment over a partially wireless connection, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 17:
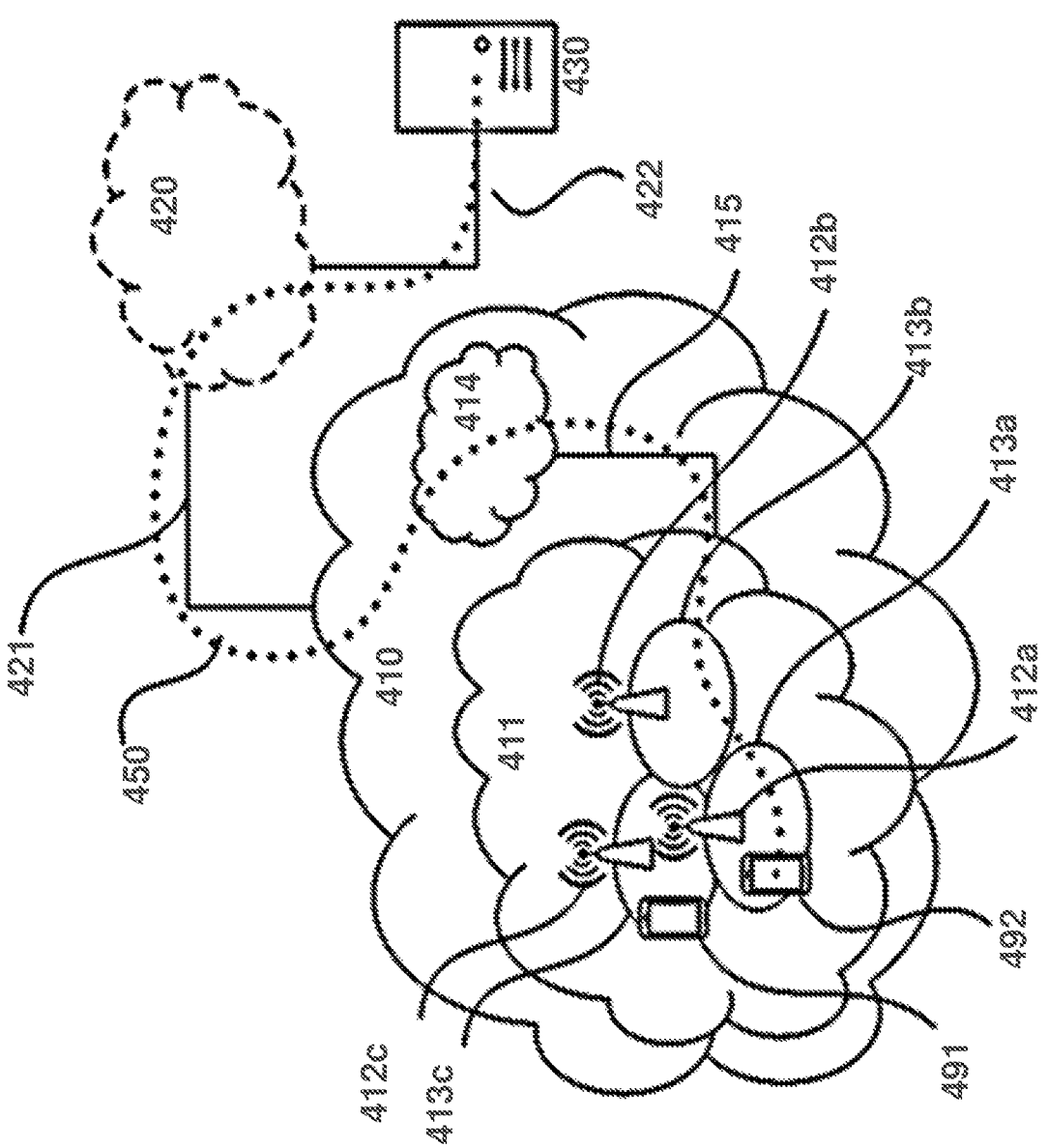
FIG. 17 illustrates an example telecommunication network connected via an intermediate network to a host computer, according to certain embodiments.

With reference to FIG. 17, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 17 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

FIG. 18 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 18. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 18) served by base station 520. Communication interface 526 may be configured to facilitate connection 560 to host computer 510. Connection 560 may be direct, or it may pass through a core network (not shown in FIG. 18) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 18 may be similar or identical to host computer 430, one of base stations 412a, 412b, 412c and one of UEs 491, 492 of FIG. 16, respectively. This is to say, the inner workings of these entities may be as shown in FIG. 18 and independently, the surrounding network topology may be that of FIG. 16.

In FIG. 18, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 19:
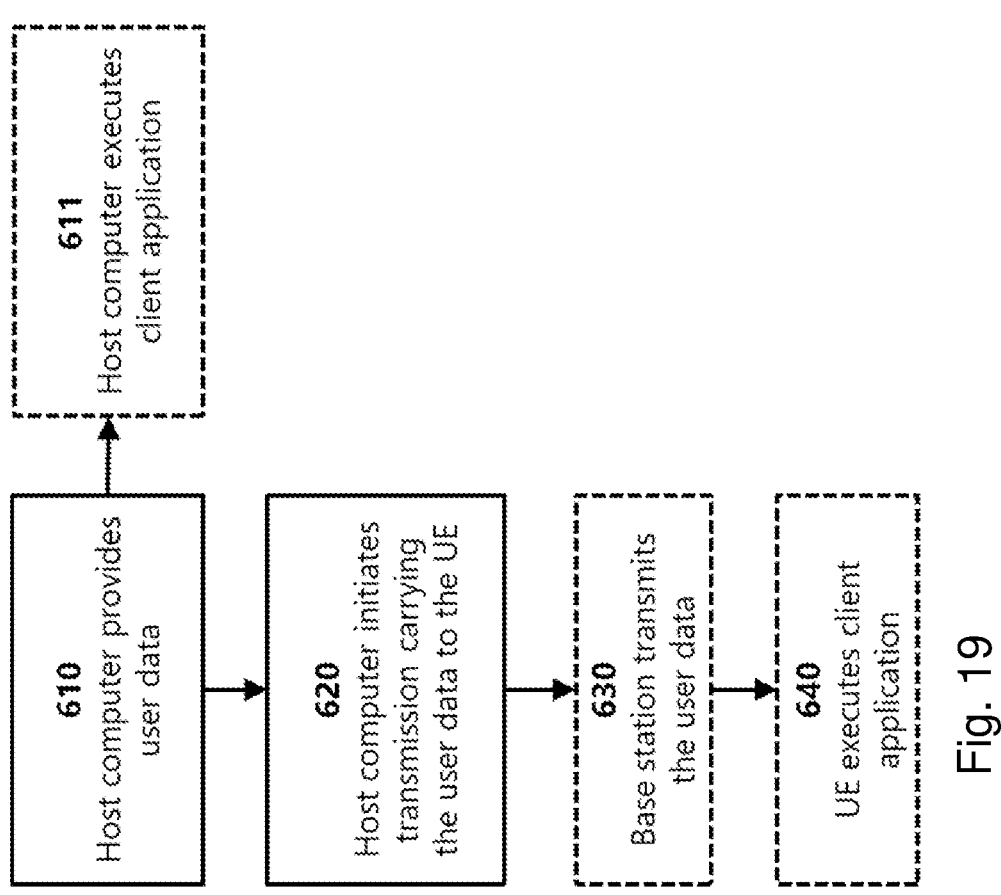
FIG. 19 is a flowchart illustrating a method implemented, according to certain embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 20:
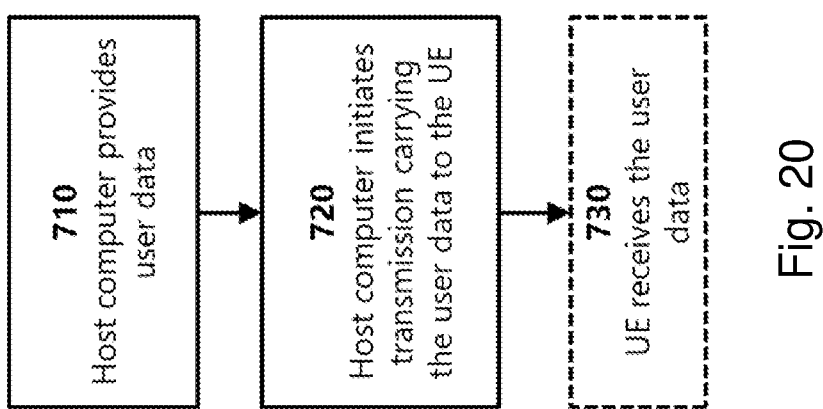
FIG. 20 is a flowchart illustrating a method implemented in a communication system, according to certain embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

The invention claimed is:

1. A method performed by a wireless device operating in a non-terrestrial network (NTN), the method comprising:
   receiving a first tracking area identity (TAI) from a first cell, wherein the first cell is an earth moving cell and the first TAI is associated with a first fixed tracking area, and the first TAI is included in a TAI list of the wireless device;
   receiving a second TAI, the second TAI associated with a second fixed tracking area, and the second TAI is not included in the TAI list;
   determining whether the wireless device should notify a network node of a tracking area update based at least in part on information related to the second TAI and a time delay from a time the wireless device received the second TAI; and
   upon determining the wireless device should notify the network node of the tracking area update, transmitting a tracking area update.

2. The method of claim 1, wherein determining whether the wireless device should notify the network node of the tracking area update is based on a minimum cell quality.

3. The method of claim 1, wherein determining whether the wireless device should notify the network node of the tracking area update is based on one or more of:
   a geographic location of the wireless device;
   an amount of geographic movement of the wireless device over a time period;
   an amount of time in the first cell;
   an amount of time using the first TAI;
   an expected time of change from the first TAI to the second TAI; and
   an expected time of change from the first cell to a second cell.

4. The method of claim 1, wherein the second TAI is received from the first cell or a second cell.

5. The method of claim 1, further comprising receiving a TAI broadcast schedule.

6. A wireless device capable of operating in a non-terrestrial network (NTN), the wireless device comprising a memory coupled to processing circuitry, the processing circuitry operable to:
   receive a first tracking area identity (TAI) from a first cell, wherein the first cell is an earth moving cell and the first TAI is associated with a first fixed tracking area, and the first TAI is included in a TAI list of the wireless device;
   receive a second TAI, the second TAI associated with a second fixed tracking area, and the second TAI is not included in the TAI list;
   determine whether the wireless device should notify a network node of a tracking area update based at least in part on information related to the second TAI and a time delay from a time the wireless device received the second TAI; and
   upon determining the wireless device should notify the network node of the tracking area update, transmit a tracking area update.

7. The wireless device of claim 6, wherein the processing circuitry is operable to determine whether the wireless device should notify the network node of the tracking area update based on a minimum cell quality.

8. The wireless device of claim 6, wherein the processing circuitry is operable to determine whether the wireless device should notify the network node of the tracking area update based on one or more of:
   a geographic location of the wireless device;
   an amount of geographic movement of the wireless device over a time period;
   an amount of time in the first cell;
   an amount of time using the first TAI;
   an expected time of change from the first TAI to the second TAI; and
   an expected time of change from the first cell to a second cell.

9. The wireless device of claim 6, wherein the second TAI is received from the first cell or a second cell.

10. The wireless device of claim 6, the processing circuitry further operable to receive a TAI broadcast schedule.

11. A method performed by a network node operating in a non-terrestrial network (NTN), the method comprising:
   determining a list of one or more tracking area identities (TAIs) that will be valid in an earth moving cell over a period of time, wherein each of the one or more TAIs is associated with a fixed tracking area; and
   transmitting the list of one or more TAIs and a time delay to determine whether to perform a tracking area update to a wireless device in the cell.

12. A network node capable of operating in a non-terrestrial network (NTN), the network node comprising a memory coupled to processing circuitry, the processing circuitry operable to:
   determine a list of one or more tracking area identities (TAIs) that will be valid in an earth moving cell over a period of time, wherein each of the one or more TAIs is associated with a fixed tracking area; and
   transmit the list of one or more TAIs and a time delay to determine whether to perform a tracking area update to a wireless device in the cell.

* * * * *